Dec. 28, 1954     W. S. TANDLER ET AL     2,697,879
INDICATING, SIGNALING AND RECORDING GAUGE
Filed March 23, 1948     22 Sheets-Sheet 1
FIG.I.
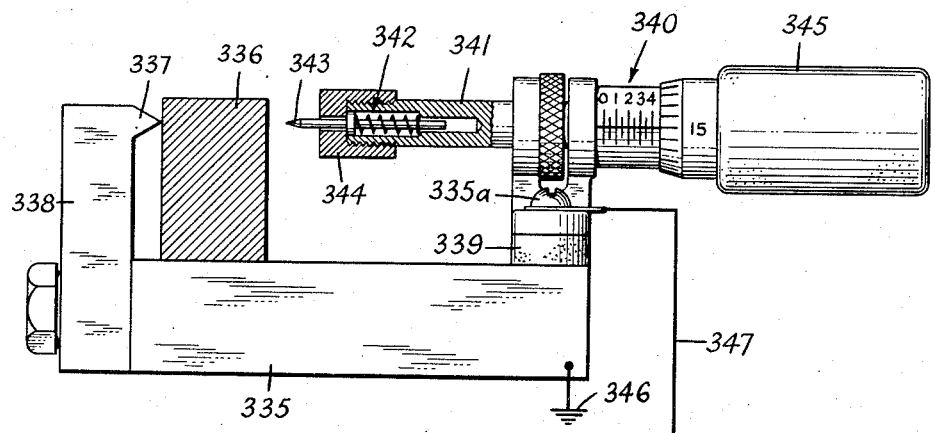
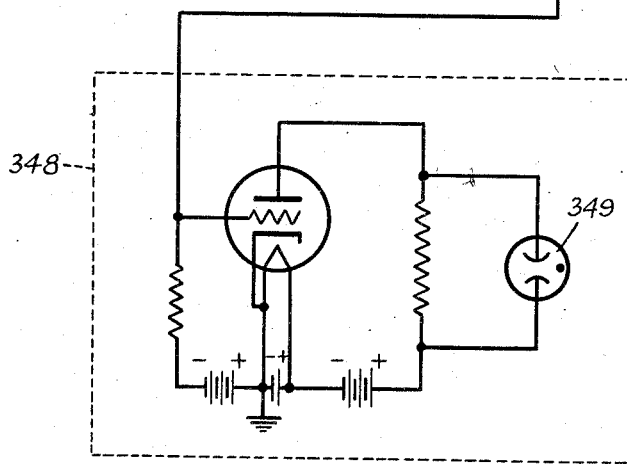
INVENTORS.
WILLIAM S. TANDLER
DAVID S. WALKER
BY MORRIS GROSSMAN
THEIR ATTORNEYS.

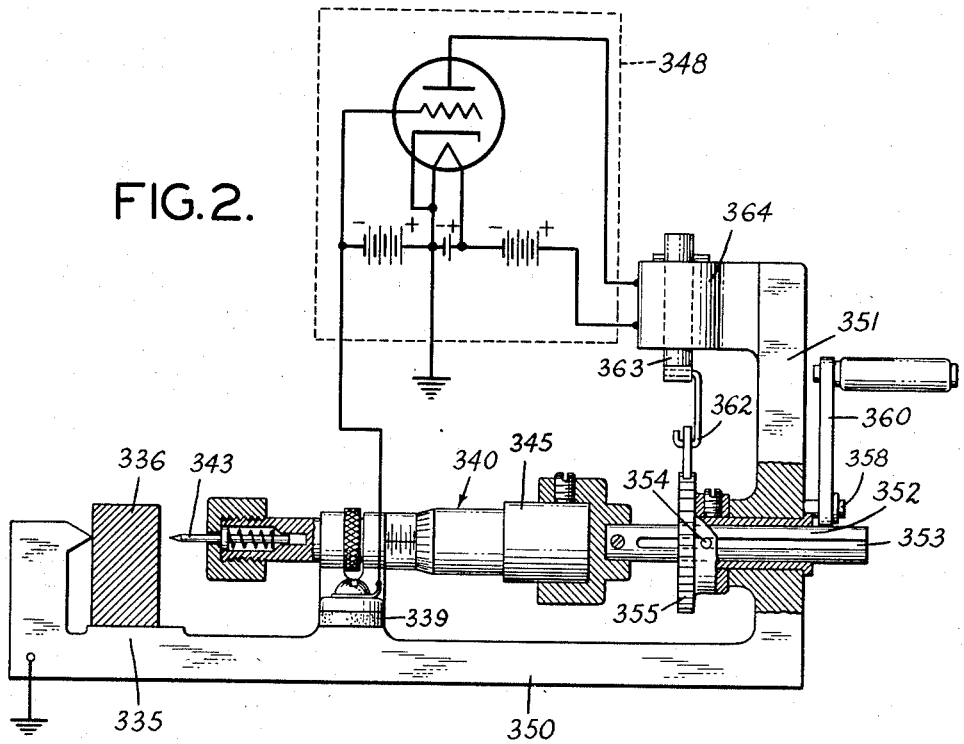
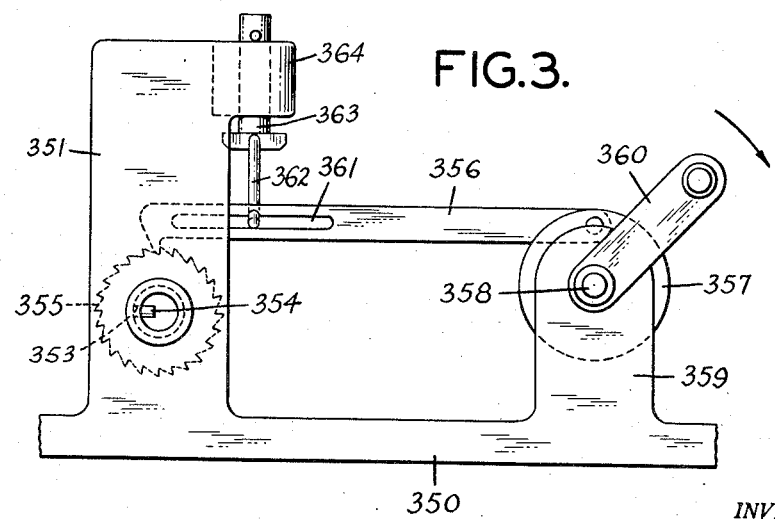

Dec. 28, 1954   W. S. TANDLER ET AL   2,697,879
INDICATING, SIGNALING AND RECORDING GAUGE
Filed March 23, 1948   22 Sheets-Sheet 3

*INVENTORS.*
WILLIAM S. TANDLER
DAVID S. WALKER
BY MORRIS GROSSMAN

Campbell, Brumbaugh & Rea
*THEIR ATTORNEYS.*

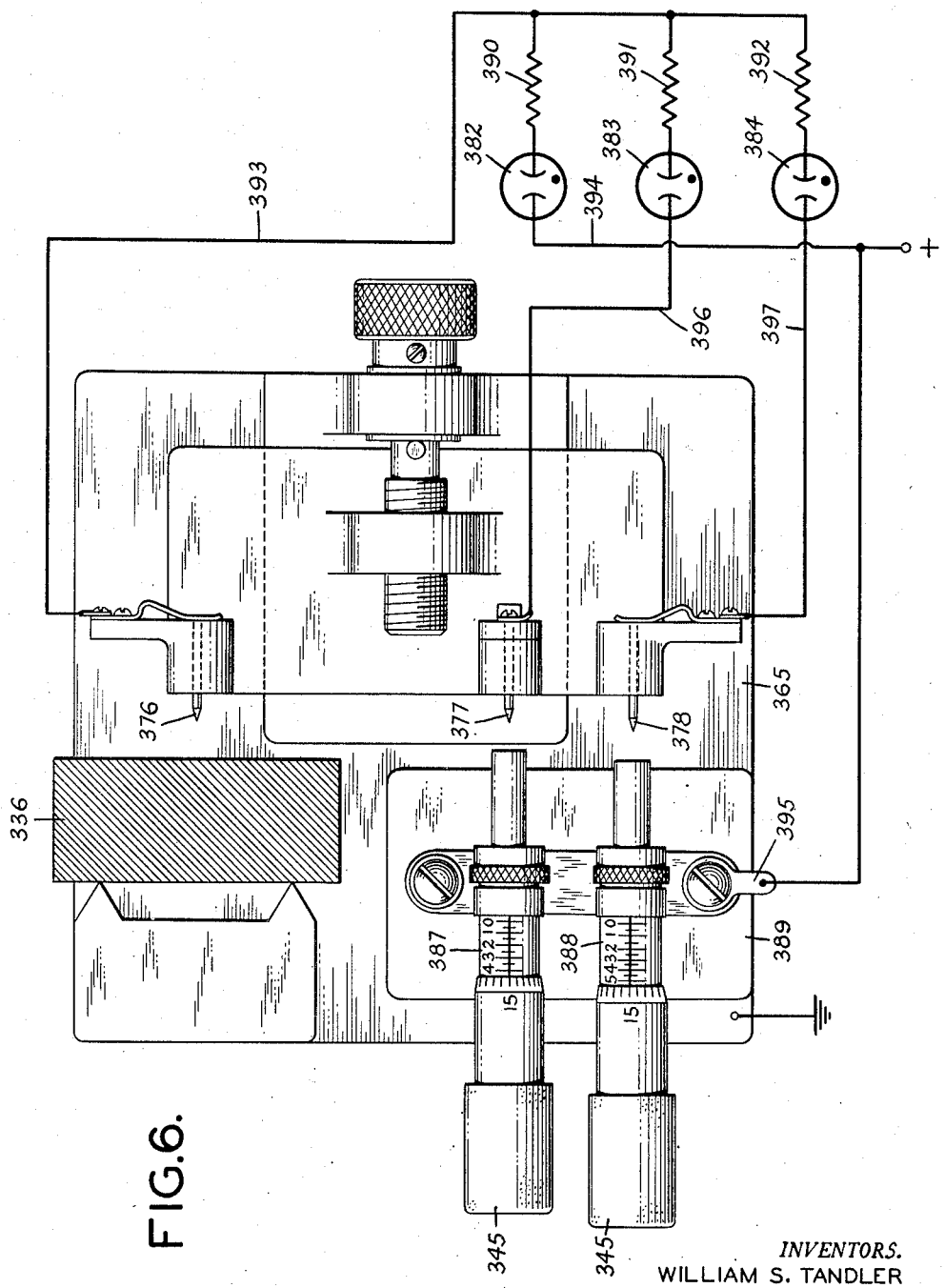

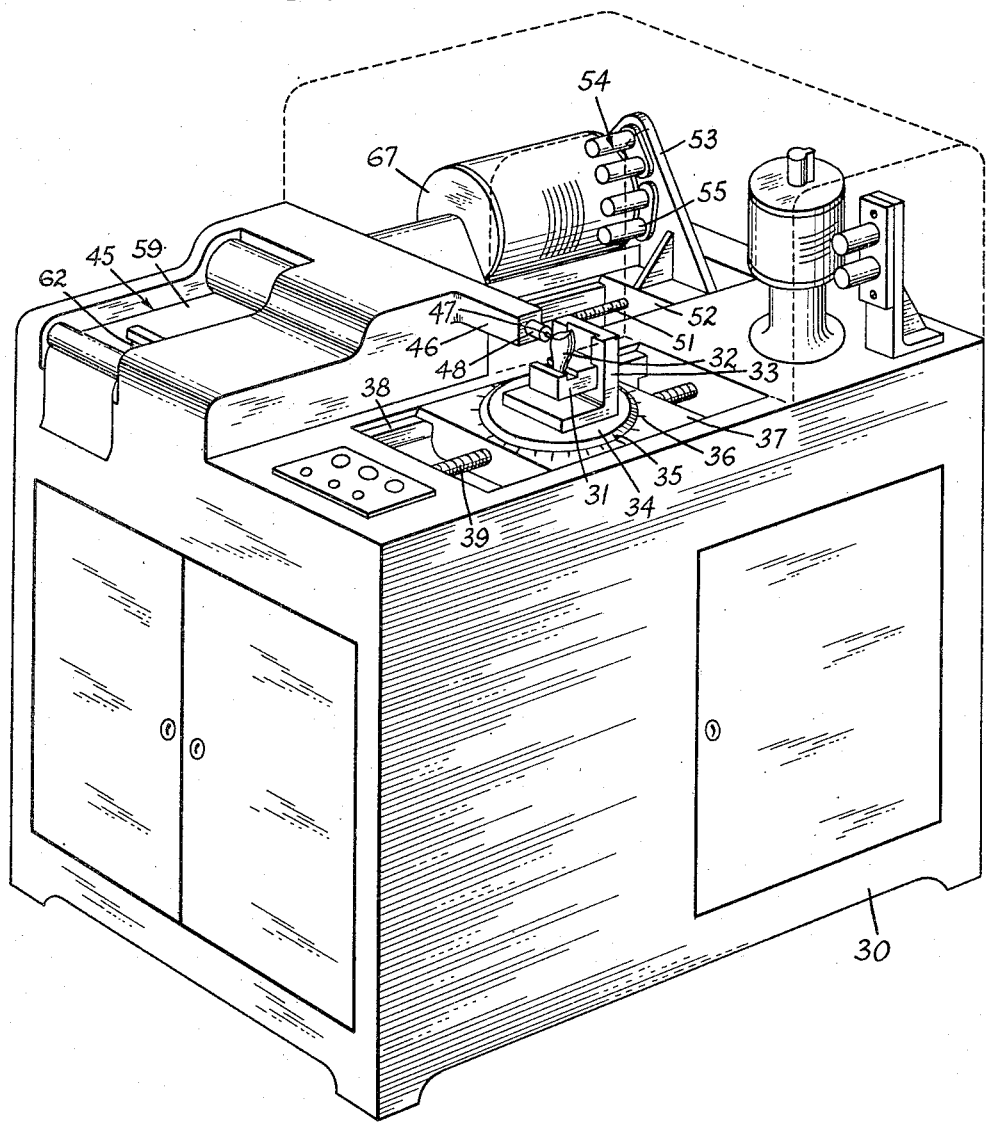

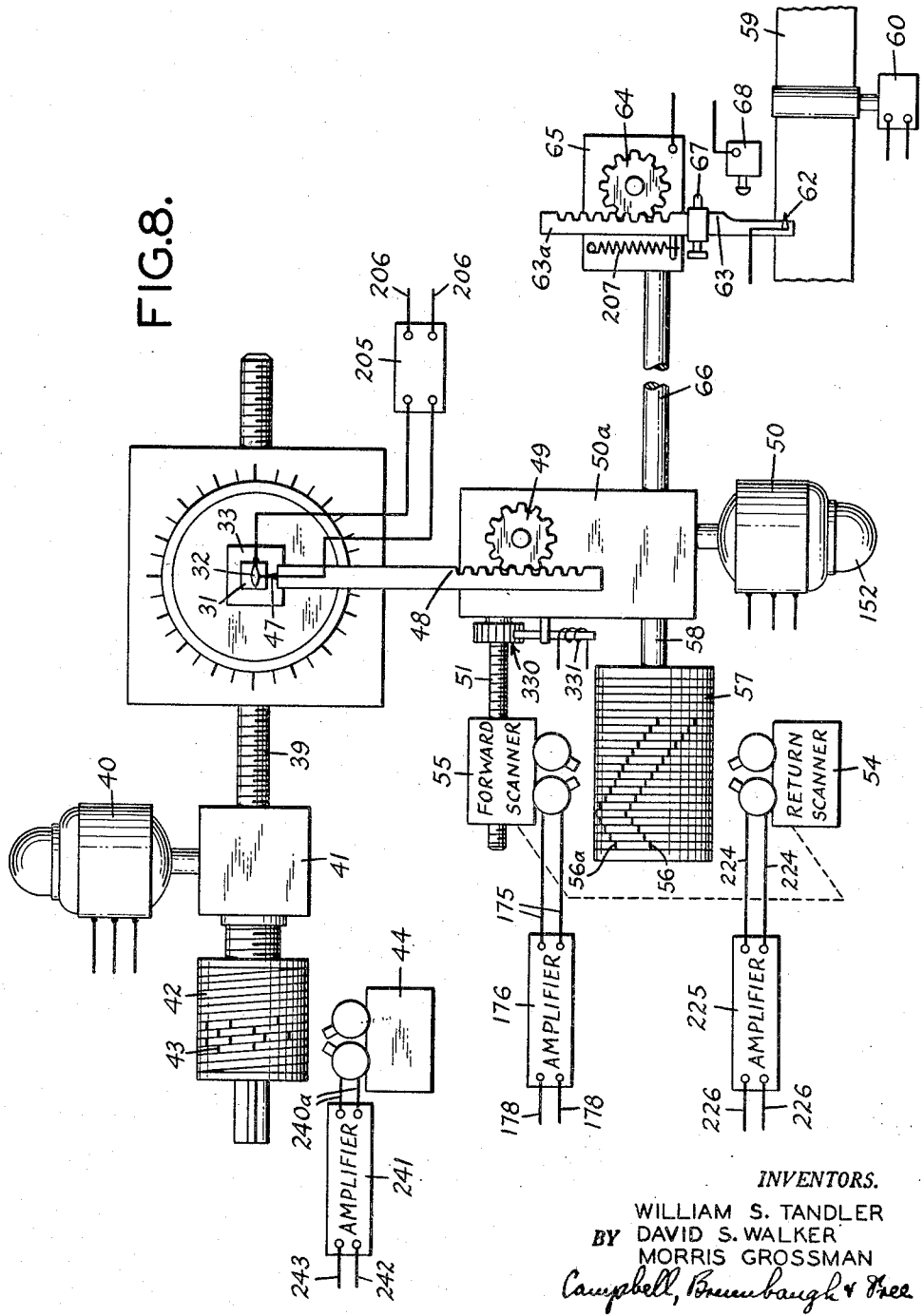

Dec. 28, 1954 W. S. TANDLER ET AL 2,697,879
INDICATING, SIGNALING AND RECORDING GAUGE
Filed March 23, 1948 22 Sheets-Sheet 7
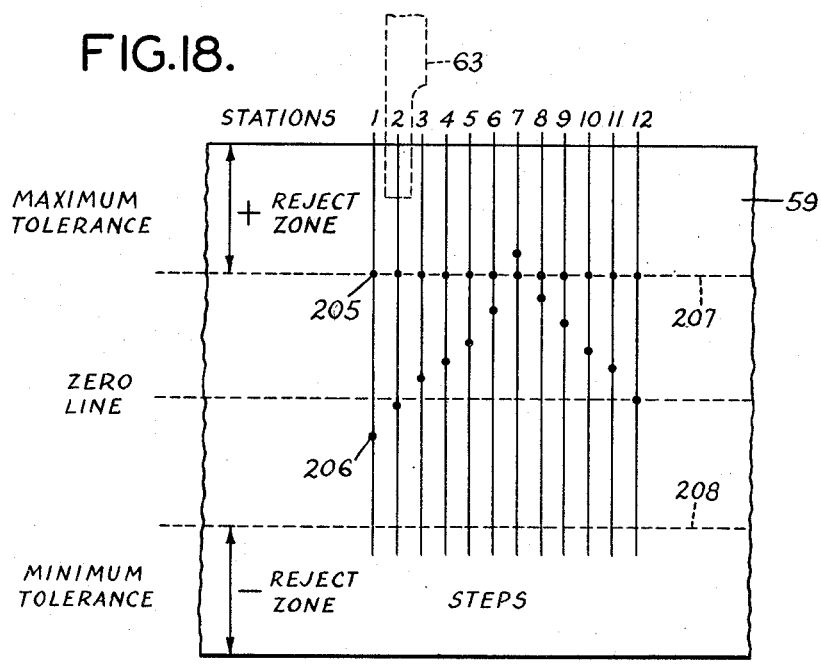
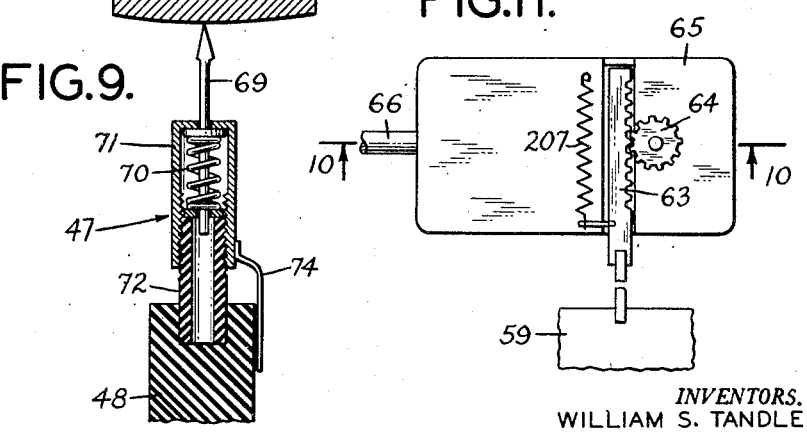
INVENTORS.
WILLIAM S. TANDLER
DAVID S. WALKER
MORRIS GROSSMAN
BY
Campbell, Brumbaugh & Free
THEIR ATTORNEYS.

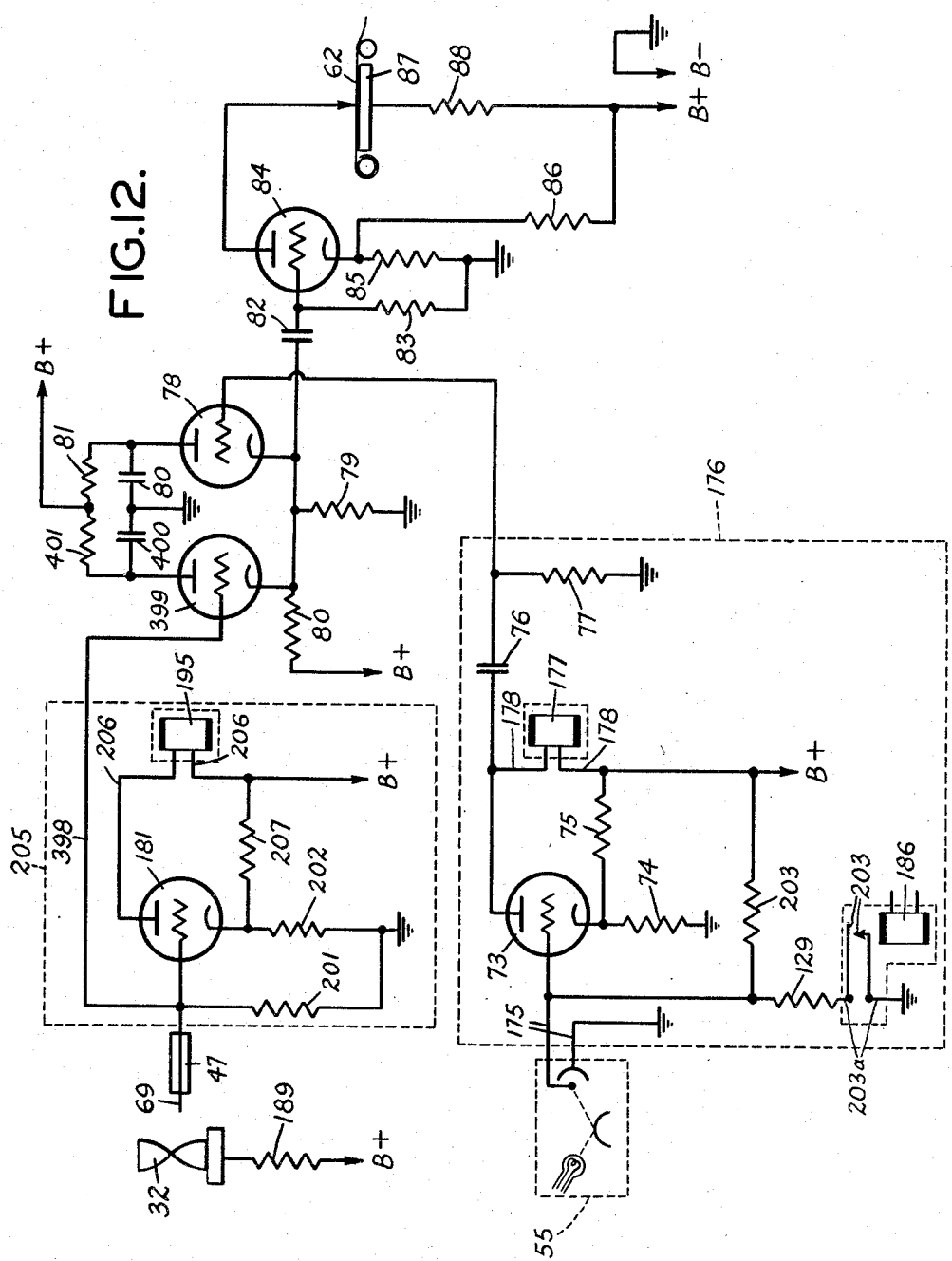

Dec. 28, 1954 W. S. TANDLER ET AL 2,697,879
INDICATING, SIGNALING AND RECORDING GAUGE
Filed March 23, 1948 22 Sheets-Sheet 10

INVENTORS.
WILLIAM S. TANDLER
DAVID S. WALKER
BY MORRIS GROSSMAN

THEIR ATTORNEYS

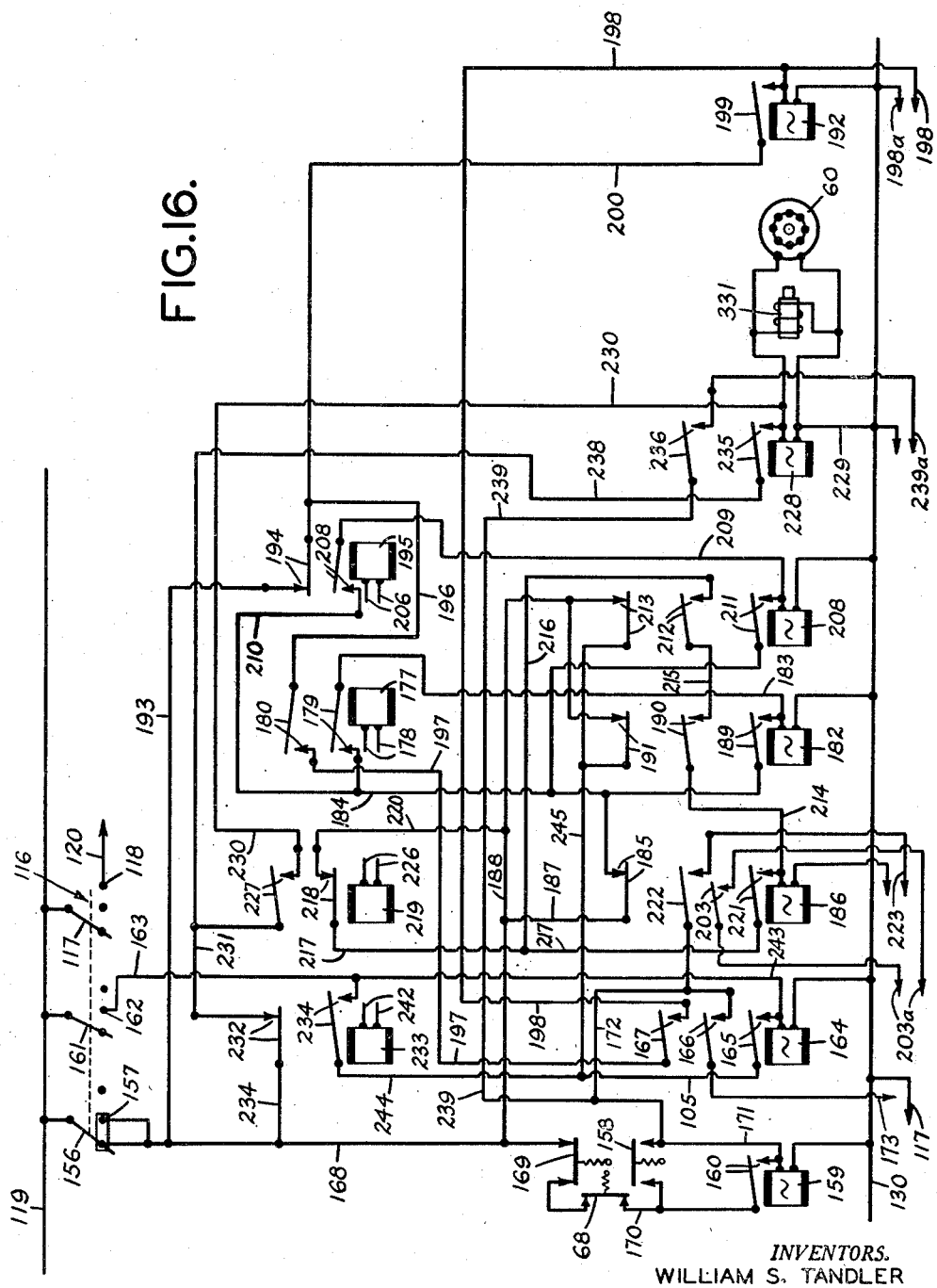

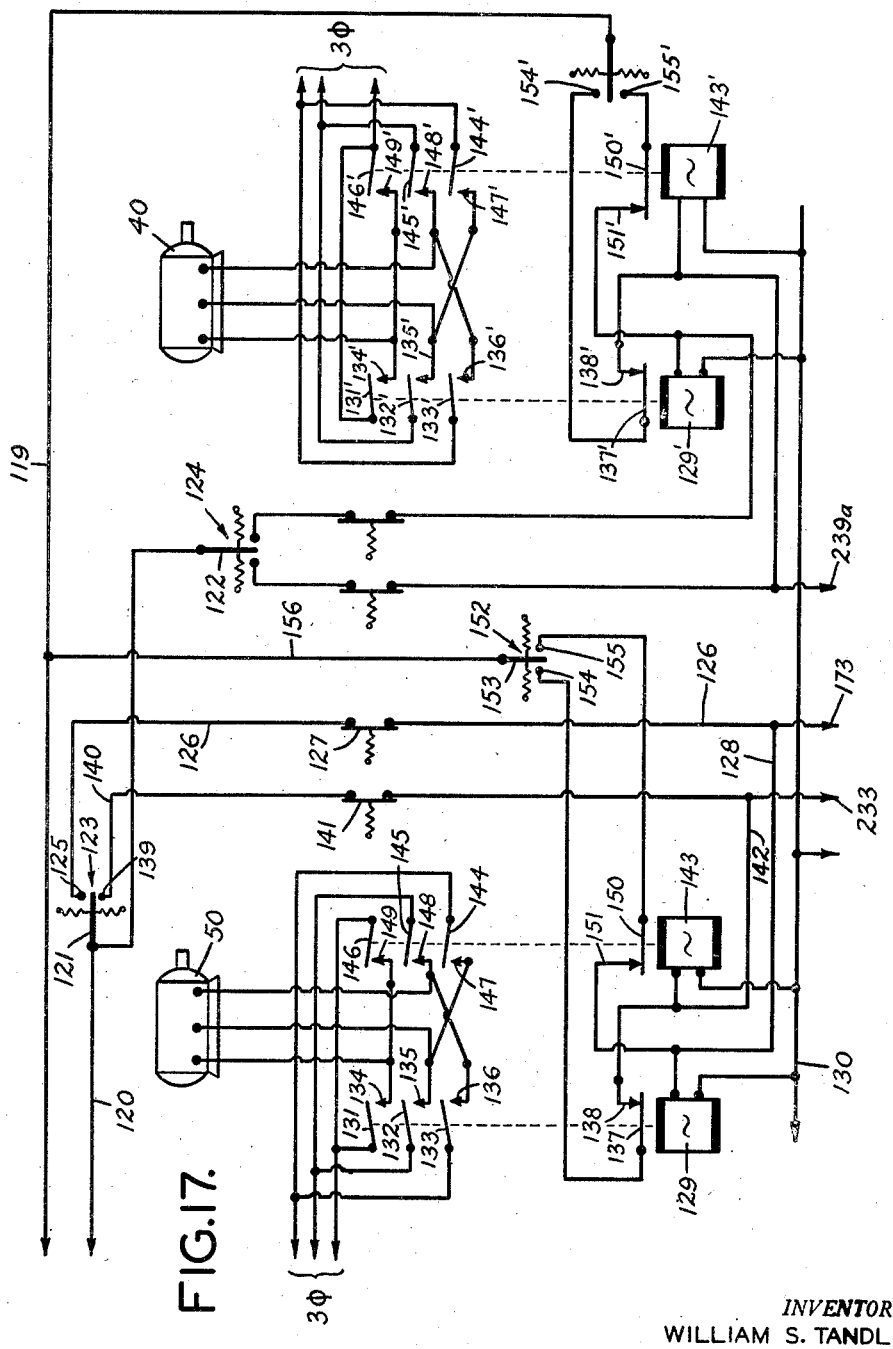

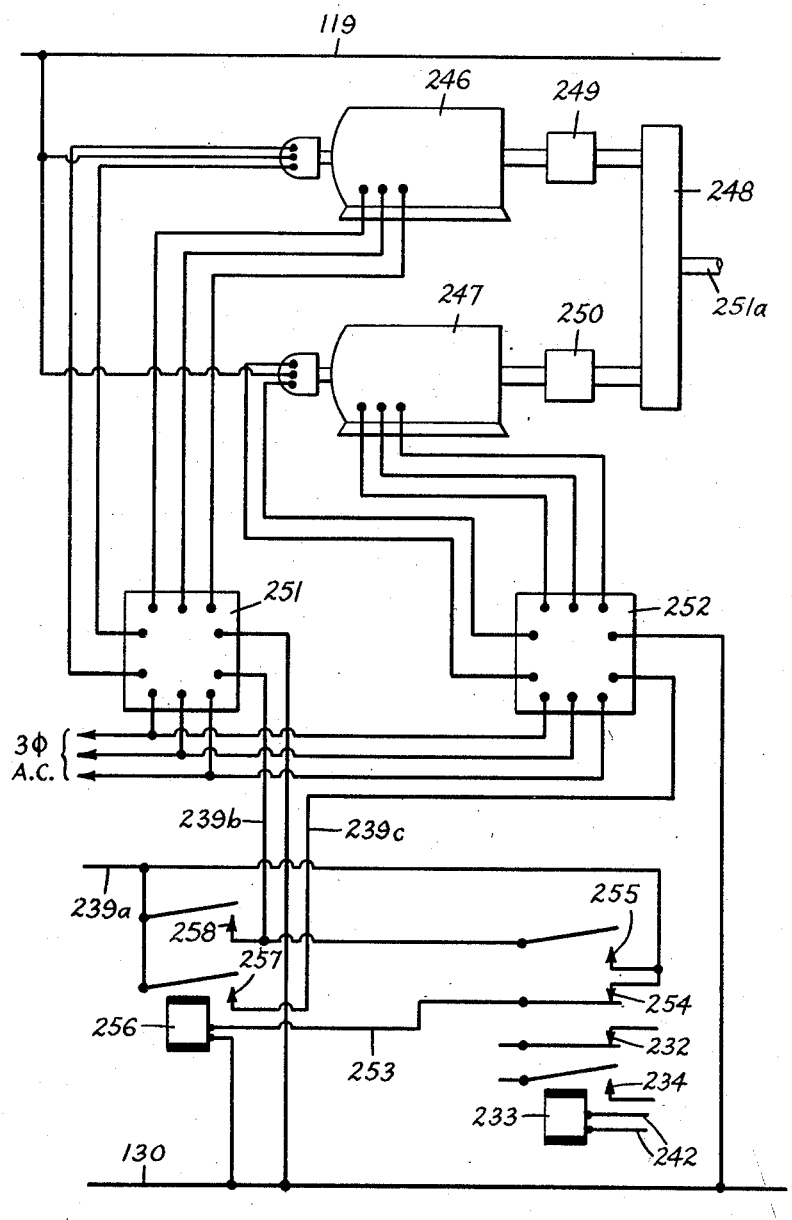

Dec. 28, 1954   W. S. TANDLER ET AL   2,697,879
INDICATING, SIGNALING AND RECORDING GAUGE
Filed March 23, 1948   22 Sheets-Sheet 14
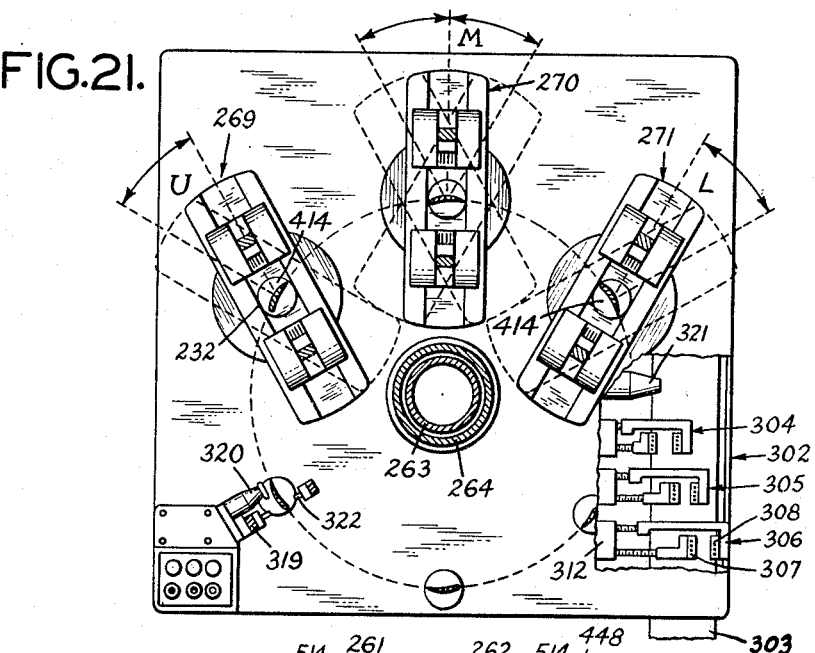
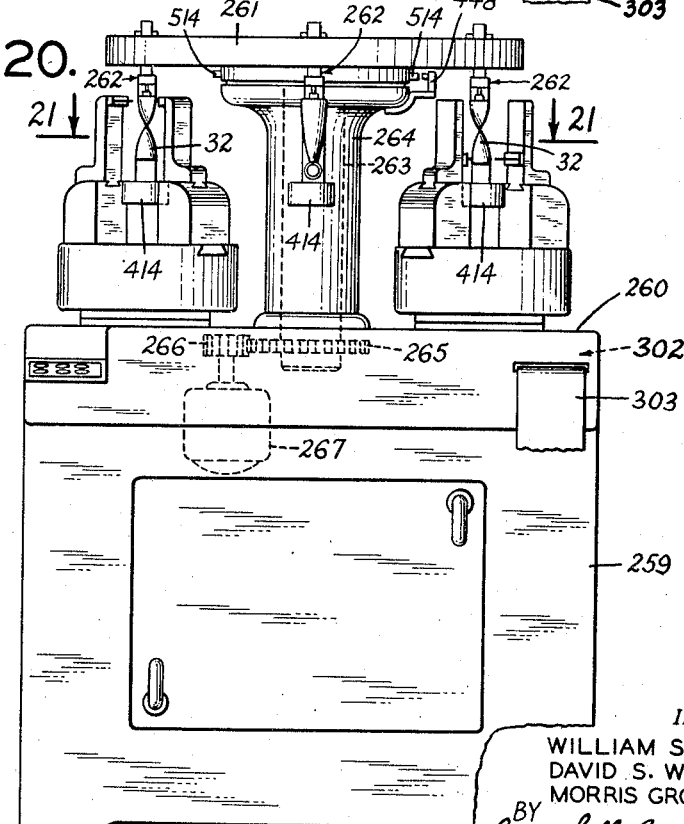
INVENTORS.
WILLIAM S. TANDLER
DAVID S. WALKER
MORRIS GROSSMAN
BY Campbell, Brumbaugh & Free
THEIR ATTORNEYS.

Dec. 28, 1954   W. S. TANDLER ET AL   2,697,879
INDICATING, SIGNALING AND RECORDING GAUGE
Filed March 23, 1948   22 Sheets-Sheet 15

INVENTORS.
WILLIAM S. TANDLER
DAVID S. WALKER
MORRIS GROSSMAN
BY
THEIR ATTORNEYS.

Dec. 28, 1954  W. S. TANDLER ET AL  2,697,879
INDICATING, SIGNALING AND RECORDING GAUGE
Filed March 23, 1948  22 Sheets-Sheet 16
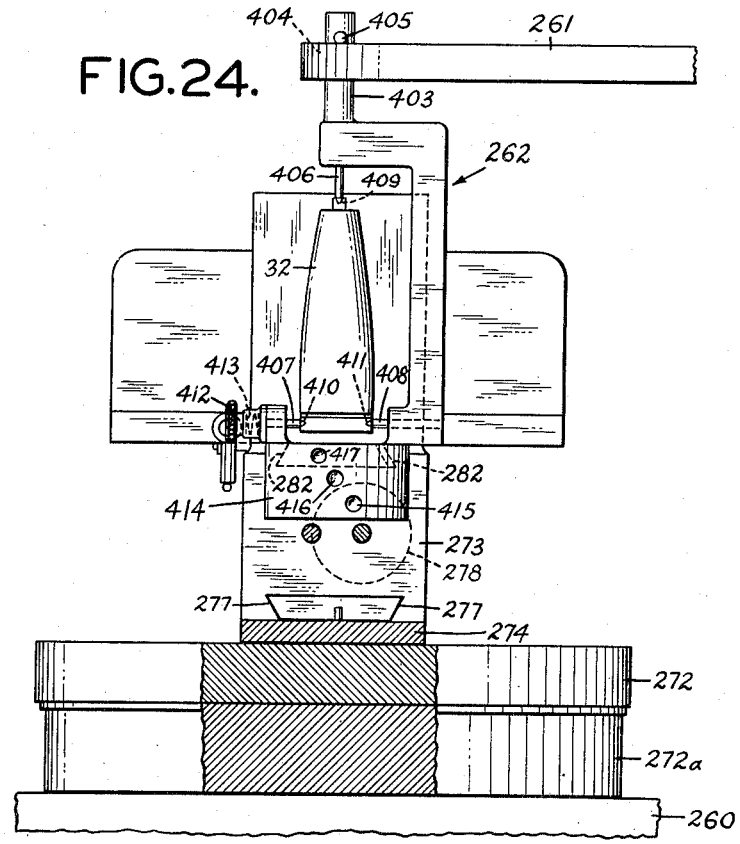
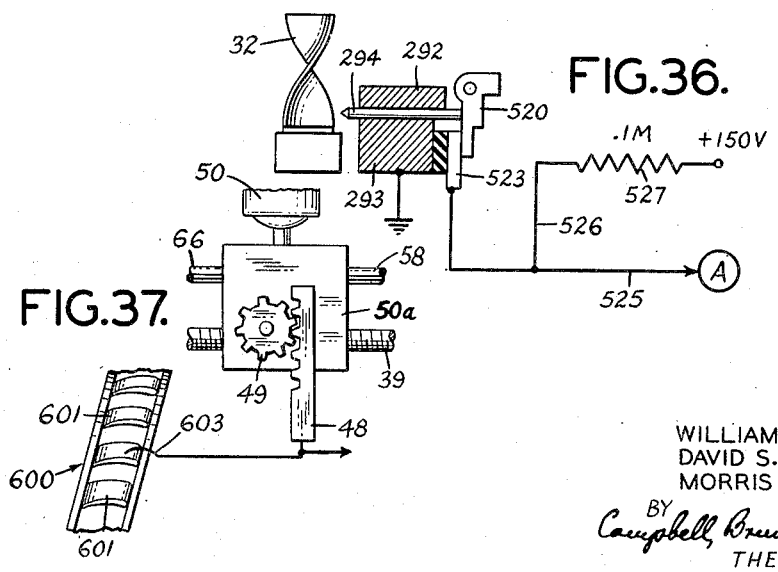
INVENTORS.
WILLIAM S. TANDLER
DAVID S. WALKER
MORRIS GROSSMAN
BY
Campbell, Brumbaugh & Free
THEIR ATTORNEYS Dec. 28, 1954   W. S. TANDLER ET AL   2,697,879
INDICATING, SIGNALING AND RECORDING GAUGE
Filed March 23, 1948   22 Sheets-Sheet 17

INVENTORS.
WILLIAM S. TANDLER
DAVID S. WALKER
MORRIS GROSSMAN
BY
Campbell, Brumbaugh & Free
THEIR ATTORNEYS.

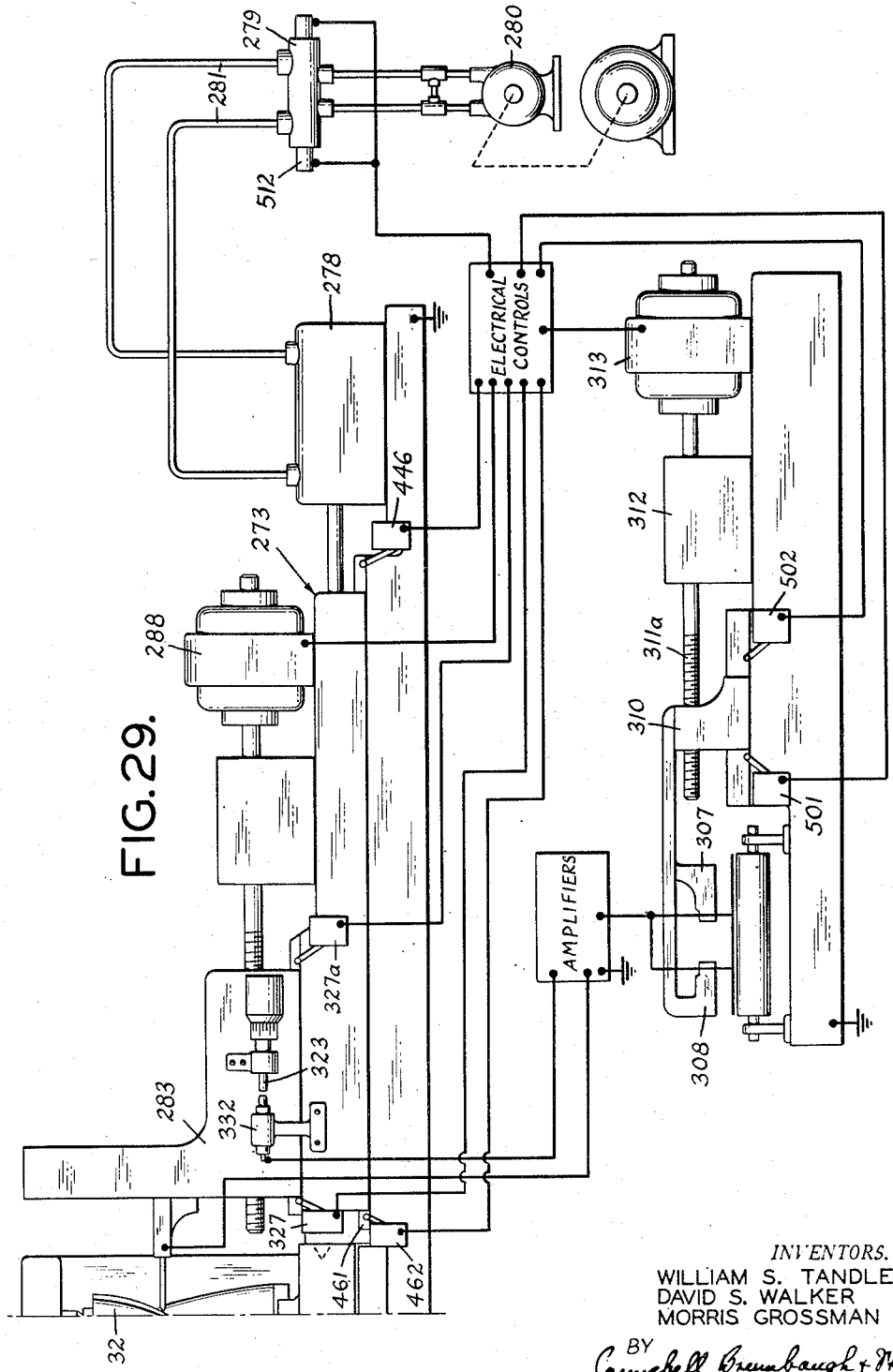

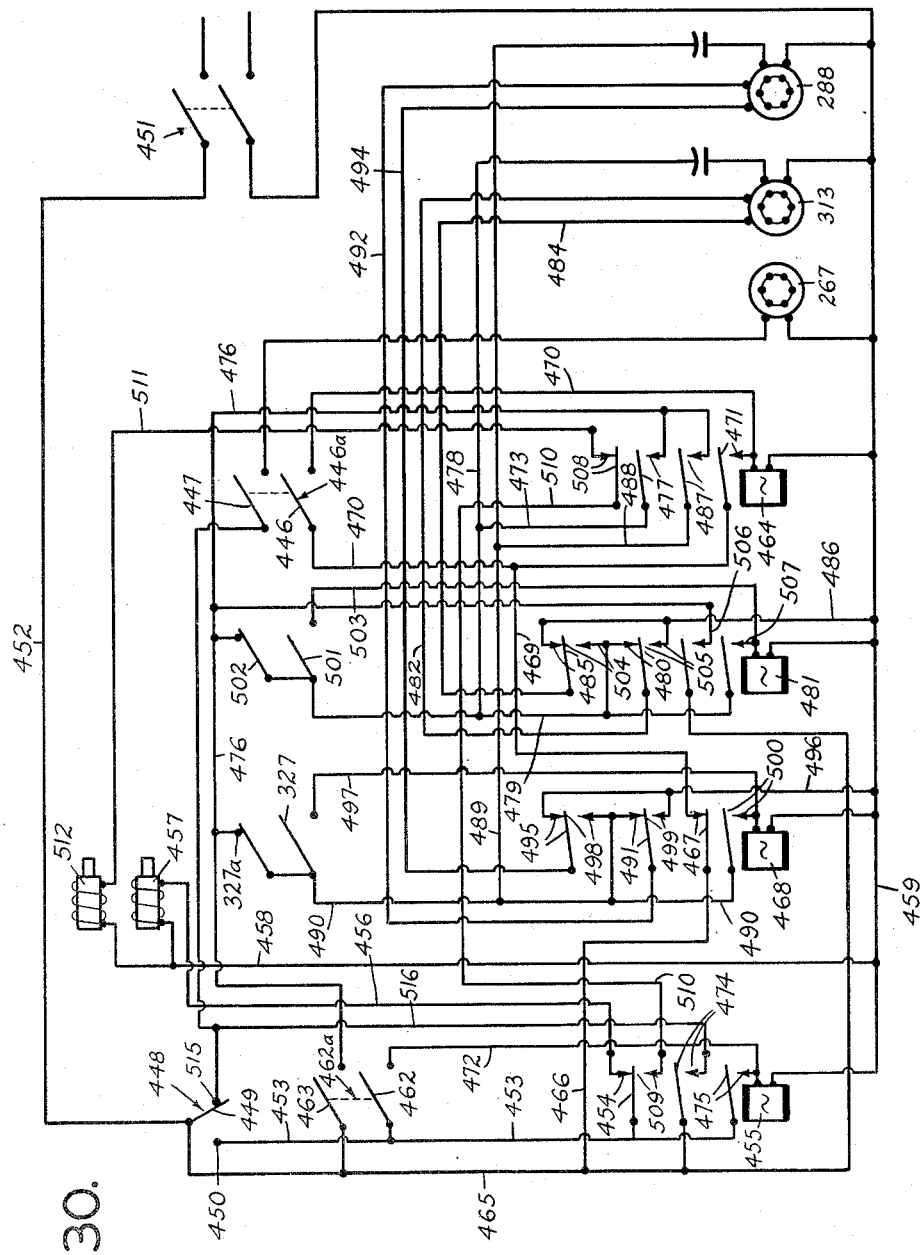

Dec. 28, 1954  W. S. TANDLER ET AL  2,697,879
INDICATING, SIGNALING AND RECORDING GAUGE
Filed March 23, 1948  22 Sheets-Sheet 21
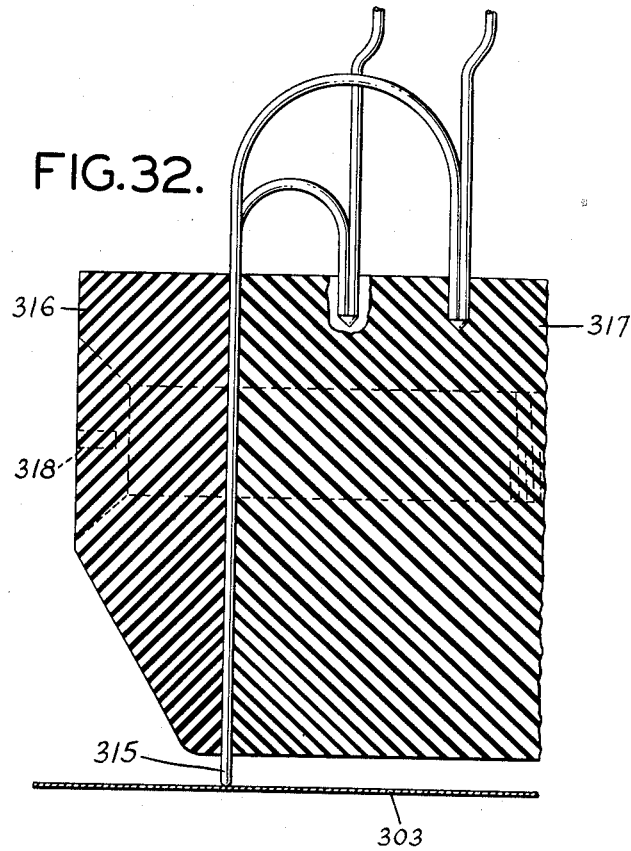
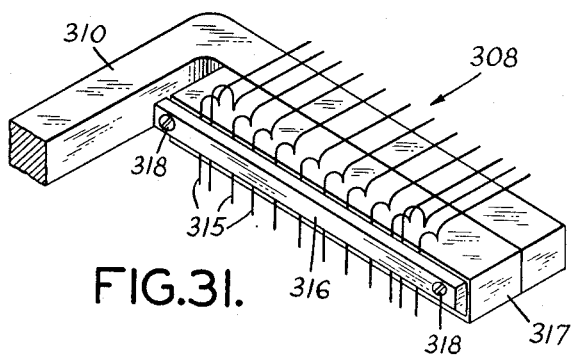
INVENTORS.
WILLIAM S. TANDLER
DAVID S. WALKER
MORRIS GROSSMAN
BY
*Campbell, Brumbaugh & Free*
THEIR ATTORNEYS.

Dec. 28, 1954   W. S. TANDLER ET AL   2,697,879
INDICATING, SIGNALING AND RECORDING GAUGE
Filed March 23, 1948   22 Sheets-Sheet 22

INVENTORS.
WILLIAM S. TANDLER
DAVID S. WALKER
MORRIS GROSSMAN
BY Campbell, Brumbaugh & Free
THEIR ATTORNEYS.

United States Patent Office 2,697,879
Patented Dec. 28, 1954

2,697,879

INDICATING, SIGNALING, AND RECORDING GAUGE

William S. Tandler and David S. Walker, New York, and Morris Grossman, Flushing, N. Y., assignors, by mesne assignments, to The Warner & Swasey Research Corporation, Cleveland, Ohio, a corporation of Ohio Application March 23, 1948, Serial No. 16,536

29 Claims. (Cl. 33—174)

The present invention relates to gauging apparatus and more particularly to new and improved apparatus for providing indications representative of the conformity or nonconformity of a part with specifications for the part.

It has been exceedingly difficult, heretofore, to measure accurately the contours or profiles of irregularly shaped machine parts such as, for example, blades and buckets for turbines and axial fans. Yet, since such parts are frequently operated at very high speeds, it is absolutely essential that they be carefully checked for conformity with specifications. Formerly, this could be done only by using specially designed equipment such as the optical comparator or guillotine gauges, for example, which require highly trained personnel and are time-consuming in operation.

The principal object of the present invention is to provide new and improved apparatus for gauging machine parts which is simple yet highly effective and accurate in operation.

A further object of the invention is to provide new and improved gauging apparatus of the above character in which the measurement is made at or near zero contact pressure, without distortion of the test part and without leaving any visible mark or scoring on the part to be tested, electronic amplification being employed to magnify the signals sufficiently to render the apparatus effective for the purpose.

Another object of the invention is to provide new and improved gauging apparatus of the above character which provides indications of the deviation of the contour of a test part from a specified or desired contour.

Still another object of the invention is to provide new and improved gauging apparatus of the above character which indicates automatically the deviations of the contour of a test part at a plurality of different stations from standard contours specified for each of those stations.

A further object of the invention is to provide new and improved gauging apparatus of the above character in which records are made substantially simultaneously of deviations of the contour of a test part at a plurality of stations from a contour specified for each station.

Another object of the invention is to provide new and improved gauging apparatus in which a signal is given when a specified tolerance is exceeded by a test part.

The invention may be better understood from the following detailed description of several typical forms thereof, taken in conjunction with the accompanying drawings, in which:

Fig. 1 is a schematic diagram of a simple form of gauge constructed according to the invention;

Fig. 2 shows schematically a gauge of the type shown in Fig. 1 modified to provide means for automatically discontinuing advancement of the probe when the latter engages the test part;

Fig. 3 is an end view of the gauge shown in Fig. 2;

Fig. 6 is a view in plan of a modification of the gauge shown in Fig. 4, which utilizes a somewhat different signalling system;

Fig. 7 is a view perspective of single probe gauging apparatus constructed according to the invention;

Fig. 8 is a schematic diagram illustrating the general arrangement of parts of the apparatus shown in Fig. 6;

Fig. 9 is a detail view of a probe assembly;

Figs. 10 and 11 illustrate schematically clutch mechanism for engaging and disengaging the recorder;

Fig. 12 is a schematic diagram of a representative recording amplifier system;

Figs. 16 and 17 are schematic diagrams of control circuits for the gauging apparatus shown in Fig. 7;

Fig. 18 illustrates a representative record produced by the apparatus of Fig. 7;

Fig. 19 is a schematic diagram of a modified form of motor control system using two motors;

Fig. 20 is a front view, in elevation, of a modified form of gauging apparatus according to the invention;

Fig. 21 is a view in transverse section taken along line 21—21 of Fig. 20;

Fig. 24 is a view in section, taken along line 24—24 of Fig. 22, looking in the direction of the arrows;

Figs. 29 and 30 are schematic diagrams illustrating a control system for the gauging apparatus of Fig. 20;

Figs. 31 and 32 are detail views of a typical multistylus recording unit;

Fig. 36 is a schematic diagram of a portion of a modified amplifier for use with the multiprobe unit shown in Fig. 35; and Fig. 37 is a schematic diagram of a modification of the apparatus shown in Figs. 7-19 which is designed for gauging blades that are in assembled relationship.

Figure 4:
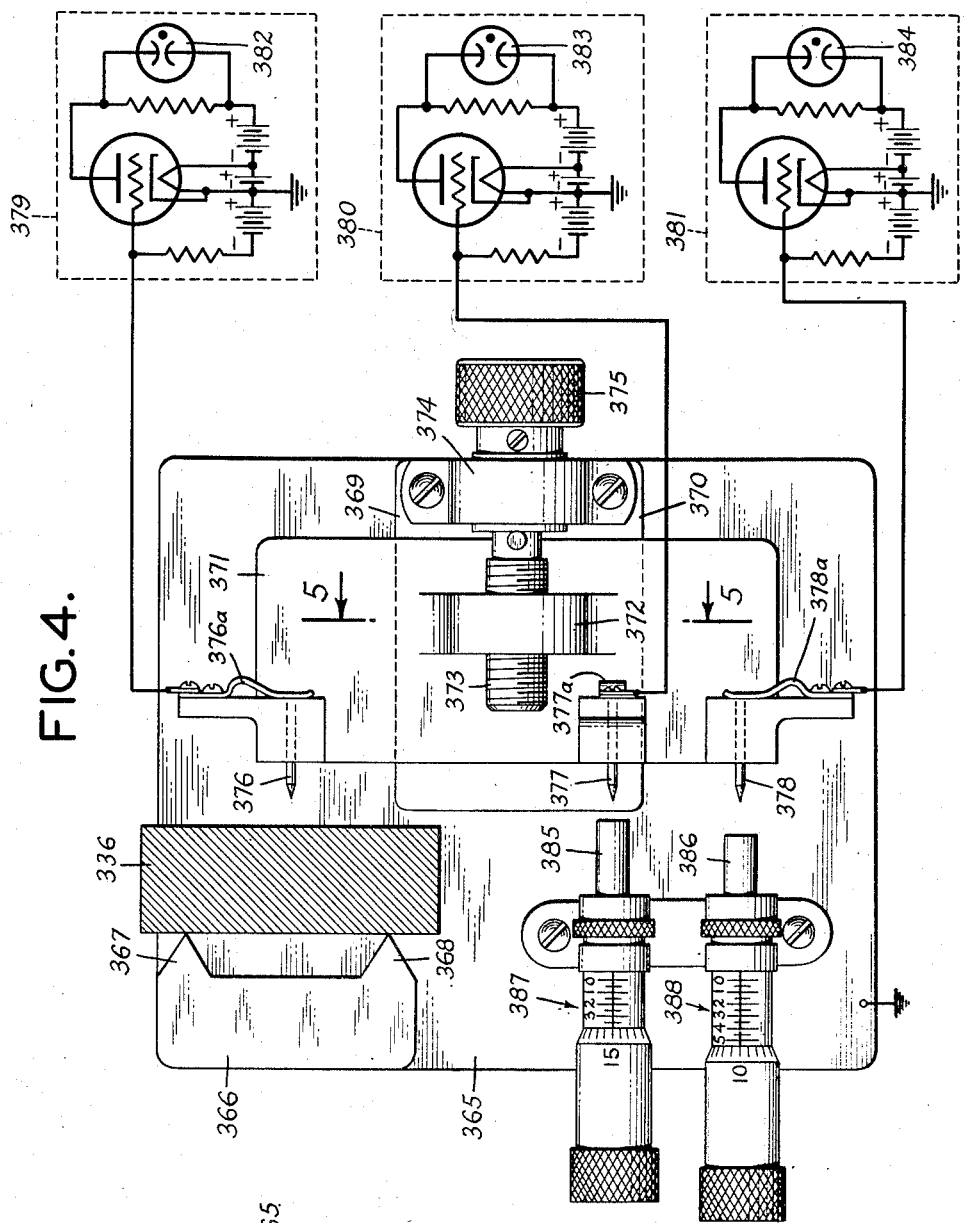
Fig. 4 is a plan view of another form of gauge for indicating the relation of a part dimension to specified maximum and minimum tolerance limits.

Fig. 1 illustrates a simple form of micrometer probe constructed according to the invention. The device may comprise, for example, a bed 335 on which a test part 336 is adapted to rest. The test part 336 may be retained in position in any suitable manner as, for example, by a knife-edge 337 on an upright member 338 secured to the bed 335.

Secured to the bed 335 is a layer of any suitable insulating material 339 to which is secured by the screws 335a, for example, a micrometer barrel and spindle assembly 340 which may be generally of standard construction with certain modifications. It differs from the usual micrometer in that the spindle end 341 is recessed to provide a chamber containing a spring loaded probe 342, the tip 343 of which extends through a cap 344 on the spindle 341, as shown. The tip 343 is preferably made of a suitable wear-resistant material such as platinum iridium, for example. Also, the micrometer thimble may be provided with a hand-grip 345 made of rubber, or other suitable material to insulate it from the hand of the operator.

The device shown in Fig. 1 is designed to provide a signal at the instant when the tip 343 of the probe 342 comes into engagement with the test part 336. To this end, the bed 335 may be grounded at 346 and the micrometer barrel may be connected by a conductor 347 to any suitable indicating instrument such as, for example, a standard electronic tube amplifier 348 having an indicating device 349 in the plate circuit thereof.

Initially, the hand-grip 345 is turned in the counter-clockwise direction to bring the probe tip 343 to a starting position. The test part 336 is then inserted in place, as shown in Fig. 1, and the hand-grip 345 is turned in the clockwise direction until the probe tip 343 just engages the surface of the part 336. This will be indicated instantaneously by operation of the indicating device 349 in the amplifier 348. The width of the test part can then be read off the micrometer barrel 340 in the usual manner.

If desired, means may be provided for immediately stopping advancement of the probe pin 343 upon engagement thereof with the test part 336, as shown in Fig. 2. In this figure, the bed 335 is provided with an extension 350 having an upright member 351. Within the upright member 351 is journalled a shaft 352 having an axial slot 353 therein adapted to receive a pin 354 on a ratchet wheel 355. One end of the shaft 352 may be secured to the insulated hand-grip 345 on the micrometer barrel 340 through a suitable coupling, as shown, to permit both rotation and advancement of the hand-grip 345 as the ratchet wheel 355 rotates.

The ratchet wheel 355 may be driven in steps by means of a pawl 356 connected to a rotatable member 357 mounted on a shaft 358. The shaft 358 is journalled in a second upright member 359 on the bed extension 350, and is adapted to be turned by means of a hand-crank 360, for example. The pawl 356 is provided with a slot 361 within which is received a hook 362 mounted on the armature 363 of a conventional solenoid 364 secured at the upper end of the upright member 351. The solenoid 364 may be connected in the plate circuit of the amplifier 348 in place of the indicating device 349.

In operation of the device shown in Figs. 2 and 3, the probe point 343 is advanced toward the part 336 by turning the hand-crank 360. Upon engagement of the probe tip 343 with the part 336, the amplifier 348 instantaneously energizes the solenoid 364, pulling up its armature 363. This moves the pawl 356 out of engagement with the ratchet wheel 355 so that further rotation of the hand-crank has no effect upon the micrometer barrel 340.

Preferably, the movement of the ratchet wheel 355 should be so designed that each step or tooth will advance the micrometer by an amount equal to the minimum increment of required accuracy, such as, for example, .0001 inch.

Figure 5:
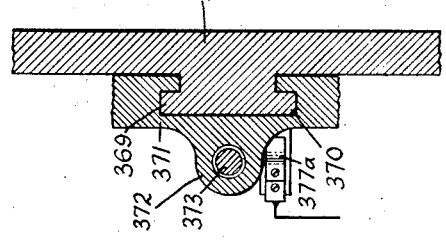
Fig. 5 is an end view of the form of gauge shown in Fig. 4.

Figs. 4, 5 and 6 disclose typical gauges constructed according to the invention for signalling whether or not the dimensions of a part lie within certain specified maximum and minimum tolerances. In Figs. 4 and 5 the gauge may comprise, for example, a bed plate 365 having an upright member 366 carrying suitable means such as the knife-edges 367 and 368, for example, to facilitate locating the test part 336 in the proper position for test. The bed plate 365 is provided with parallel guide rails 369 and 370 (Fig. 5) on which a carriage 371 is slidably mounted for movement towards and away from the test part 336.

Advancement and retraction of the carriage 371 may be accomplished by any suitable means. For example, the carriage 371 may be provided with a threaded nut member 372 which receives a lead screw 373 mounted for rotation without axial movement in an upright member 374 secured on the bed plate 365 and adapted to be turned by means of a knurled knob 375.

The carriage 371 also carries three probe pins 376, 377 and 378 which are insulated from each other and also from the carriage 371, in any appropriate manner. The probe pins 376, 377 and 378 are maintained yieldingly in reference positions by the resilient springs 376a, 377a and 378a, respectively, for example, and are connected to three separate indicating devices 379, 380 and 381 provided with suitable indicators 382, 383 and 384, respectively, as shown. The indicating devices 379, 380 and 381 may be amplifiers like the amplifier 348 in Fig. 1, for example.

The probe pin 376 is adapted to be moved into engagement with the test part 336 and the probe pins 377 and 378 are adapted to cooperate with the spindles 385 and 386, respectively, of the micrometer assemblies 387 and 388, respectively, which may be of standard type. The micrometer assemblies 387 and 388 are secured in any suitable manner directly to the bed plate 365.

In setting up the gauge shown in Figs. 4 and 5, the micrometer assemblies 387 and 388 are adjusted so that the front faces of their spindles 385 and 386, respectively, lie at positions corresponding to the maximum and minimum tolerance limits for the test piece 336, respectively, while the tips of the probe pins 376, 377 and 378 all lie on a line perpendicular to the direction of movement of the carriage 371. The carriage 371 is then advanced by turning the knob 375 until one of the probe pins 376, 377 or 378 completes a circuit to the corresponding indicating devices 379, 380 or 381.

It will be apparent upon inspection that, if the part 336 is oversize, the indicating device 379 will be actuated first. If the part 336 is within tolerances, the indicating devices 380, 379 and 381 will be energized consecutively in that order. If the test piece 336 lies outside the minimum tolerance, the indicating devices 380, 381 and 379 will be energized consecutively in that order. Thus, by observing the indicators 382, 383 and 384 the operator can readily determine whether or not the test part 336 is within specifications.

The form of the device shown in Fig. 6 is substantially the same as that shown in Figs. 4 and 5, except that a different indicating circuit is employed and the micrometer assemblies 387 and 388 are secured to the insulator 389 mounted on the bed plate 365. In this modification, three indicating devices, which may be, for example, neon lamps 382, 383 and 384 connected in series with the resistors 390, 391 and 392, respectively, are tied together at one end and are connected by a conductor 393 to the probe pin 376. The signal lamp 382 is connected by a conductor 394 to the positive terminal of the power supply (not shown) and to a lug 395 providing an electrical connection to the micrometer assemblies 387 and 388. The indicators 383 and 384 are connected by the conductors 396 and 397, respectively, to the probe pins 377 and 378.

In operation of the device shown in Fig. 6, if the test part 336 is oversize, only the indicator 382 is actuated. If the test part is within the tolerances set, the indicators 382 and 383 will be energized simultaneously, whereas, if the test part 336 lies outside the minimum tolerance, all three indicators 382, 383 and 384 will be simultaneously energized.

In the embodiment illustrated in Figs. 7–19, inclusive, a test part to be gauged is successively moved in one direction to a plurality of different stations and probing means is moved into engagement with the part at each of the stations. During movement of the probing means towards the test part, the gauging means initiates a signal which results in the production of a mark on a record strip representative of the contour which the object should have at that particular station. When the probing means engages the article to be gauged, a second signal is initiated resulting in the production of a second mark on the record strip. The record strip is moved proportionally to the displacement of the probing means so that the distance between the two marks on the record strip represents the deviation of the contour of the object being gauged from a standard or desired contour at that particular station.

Referring now to Figs. 7 and 8 one form of recording profile gauge according to the invention may comprise, for example, a base 30 having a vise 31, or other suitable means mounted thereon in which a test part such as a turbine blade 32 is adapted to be secured. The vise 31 is preferably slidably mounted in a vertical slide 33, so as to permit adjustment of the level at which the gauging operation may be carried out. The vertical slide 33 is mounted on a dial 34 having an index 35 thereon which is adapted to register with degree markings 36 formed on a carriage 37 on which the dial 34 is mounted. Suitable means (not shown) are provided for securing the dial rigidly in any selected angular position.

The carriage 37 is supported on guide rails 38 (only one being shown in Fig. 7), and is adapted to be moved in one direction by a lead screw 39 driven by a motor 40 through suitable gear reduction mechanism 41 (Fig. 8). The motor 40 is controlled by a drum 42 which carries a plurality of indicia 43 that are adapted to be scanned by conventional photoelectric scanning means 44. The scanning means 44 feeds signals to a control circuit to be described below, by means of which the motor 40 may be energized to move the test part 32 to the several stations at which the gauging operation is to be performed.

Reciprocably mounted in a suitable support 46 (Figs. 7 and 8), is a probe 47 carried by a rack 48. The rack 48 engages a pinion 49 driven from a motor 50 through a suitable gear box 50a. The gear box 50a also carries a ratchet wheel and pawl mechanism 330 which is adapted to be actuated by a solenoid 331 to turn in steps a lead screw 51. Rotation of the lead screw 51 moves a carriage 52 carrying a bracket 53 on which are mounted a pair of angularly spaced apart photoelectric scanning means 54 and 55 of conventional type. The scanning means 54 and 55 are adapted to scan suitable forward and return indicia 56 and 56a formed on a drum 57 mounted on a shaft 58 and also driven by the gear reduction system 50a, to control the to and fro motion of the probe 47.

As shown in greater detail in Fig. 9, the probe 47 may comprise, for example, a pin 69 preferably having a platinum iridium tip. The pin 69 may be urged toward the test part 32 by a compression spring 70 contained within a housing 71 threadedly or otherwise secured on a tubular member 72 made of suitable insulating material on the rack 48.

The base 30 (Fig. 7), also carries recording means 45 for making records representing the reference contour and the actual contour at each station of the test part. The recording means 45 may be of any conventional type such as a stylus 62 engaging a Teledeltos record strip 59, for example. The record strip 59 is adapted to be advanced in steps of predetermined length simultaneously with the movement of the test part carriage 37 to the several gauging stations. This may be accomplished by a suitable motor 60 controlled in a manner to be described in greater detail hereinafter. As is known, the passage of electric current through the Teledeltos strip 59 produces a visible mark thereon.

The stylus 62 may be carried by an arm 63 on a rack 63a driven by a pinion 64 through a clutch box 65 which receives a mechanical output from the gear box 50a through the shaft 66 (Fig. 8). In this fashion, the stylus 62 is adapted to be moved to and fro across the record strip in proportion to the to and fro movements of the probe 47. For accuracy, the gear box should be so designed that for a given displacement of the probe 47, the stylus moves, say, 100 times as far.

Preferably, the arm 63 has mounted thereon on actuator member 67 which is so located that when the movement of the stylus 62 exceeds a certain value corresponding to certain tolerance limits, a suitable switch 68 is actuated which shuts off the system, indicating that the object being gauged does not meet the required specifications.

In order to keep the width of the record strip 59 to a minimum, movement of the stylus 62 is not initiated until a short time before the reference mark representing the desired contour is to be made. This result may be accomplished by means of the clutch box 65 which is shown in greater detail in Figs. 10 and 11, in conjunction with suitable electrical control circuits which will be described later.

Figure 10:
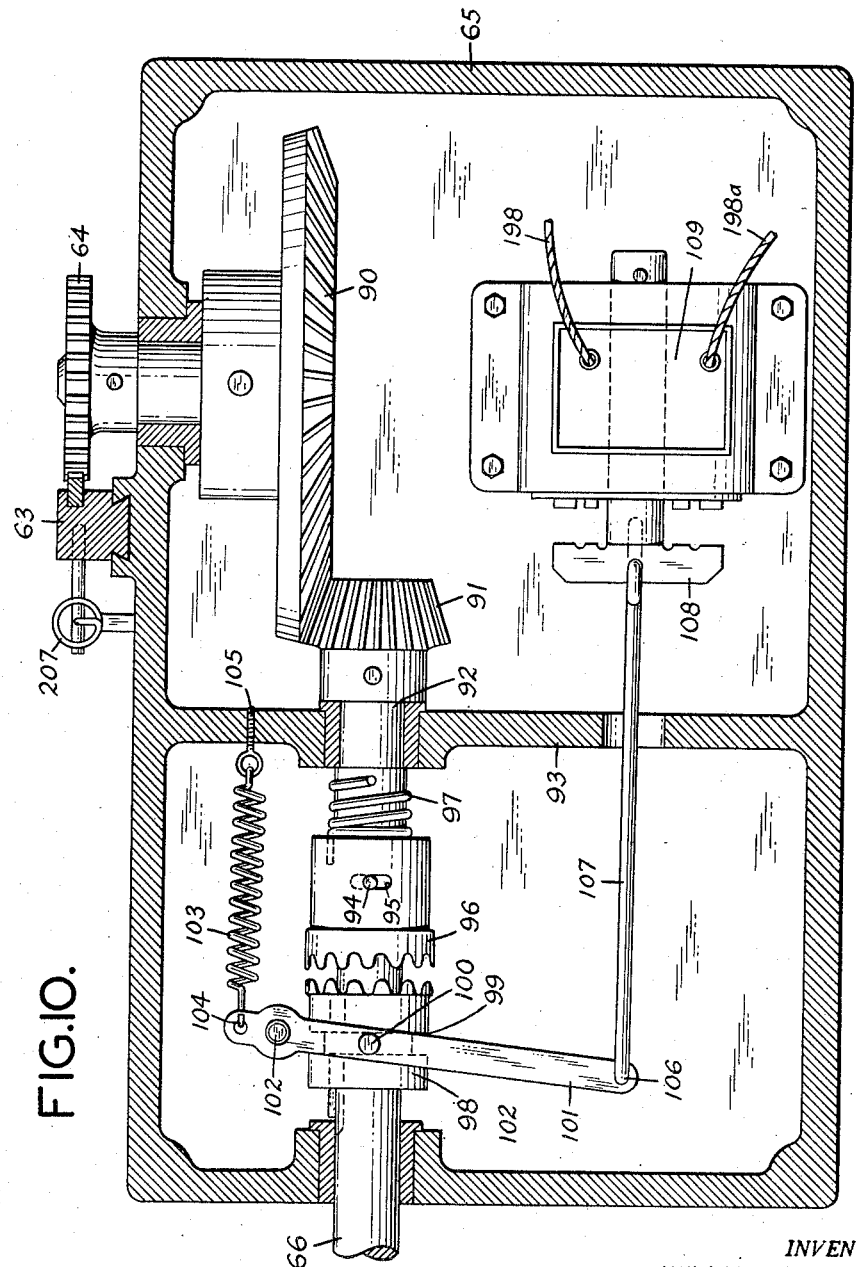

Referring now to Fig. 10, the pinion 64 which drives the stylus bearing rack 63 is driven by a conical gear 90 engaging a pinion 91 on a shaft 92 journalled in a transverse member 93. The shaft 92 carries a pin 94 which is adapted to be received within a slot 95 in a sleeve coupling 96, the slot 95 being of sufficient width to provide a lost motion coupling between the shaft 92 and the sleeve coupling 96. Also, the sleeve coupling 96 is connected to the shaft 92 through a conventional torsion spring 97, as shown.

The sleeve couping 96 is adapted to be coupled with a cooperating coupling member 98 formed on the shaft 66. The coupling member 98 has a substantially annular peripheral groove 99 formed therein which receives a pin 100 on a lever arm 101 pivoted at 102. The lever arm 101 is normally urged in the direction to bring the coupling member 98 and the sleeve coupling 96 out of engagement, by means of a conventional spring 103, one end 104 of which is secured to the upper end of the lever arm 101 and the other end of which is anchored at 105 to the transverse member 93.

Secured to the lower end 106 of the lever arm 101 is an actuator rod 107 connected to the armature 108 of a conventional solenoid 109. The solenoid 109 is actuated by electrical control circuits to be described below to bring the coupling member 98 and the sleeve coupling 96 into engagement a short time before the mark representing the desired contour for the part is to be applied to the recording strip 59, and to disengage the coupling member 98 and the sleeve coupling 96 when the probe 47 engages the test part 32.

By way of illustration, the operation of the recording profile gauge described above will be described below in gauging a turbine blade 32 of the type shown generally in Fig. 13. It will be assumed that it is desired to determine the deviations of the contour of the turbine blade 32 at a plurality of different stations in a horizontal plane therethrough along the line M.

In the following description, the contour of the test part will be defined as the perpendicular distance from the chord line 110 (Fig. 14) to the surface of the part at a plurality of different stations therealong. In the example represented in Fig. 14, twelve stations are shown.

Figure 14:
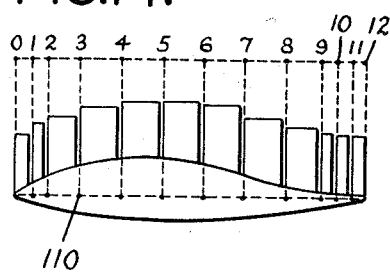
Fig. 14 is a view in transverse section taken along line 14—14 of Fig. 13 and showing the contours of a typical test piece.

In order to insure that the carriage 37 for the test part 32 will be moved the proper distance to the next station each time the motor 40 is energized, the indicia 43 on the drum 42 must be correctly spaced apart in proportion to the spacings between corresponding stations along the chord line 110 of the test part 32 (Fig. 14).

Figure 15:
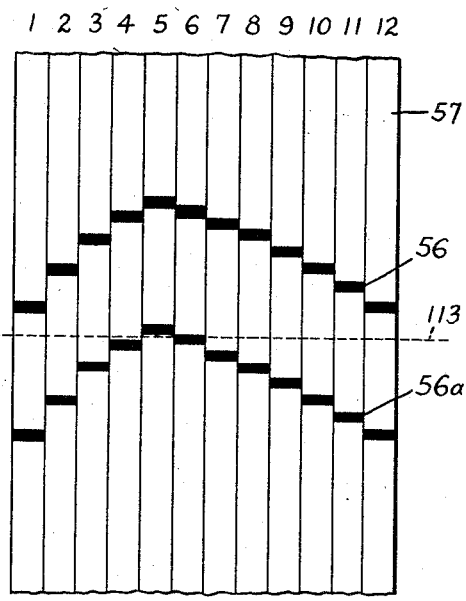
Fig. 15 is a developed view of the drum which controls the advancement and withdrawal of the probe.

Similarly, the locations of the forward and rearward controlling indicia on the drum 57 must also be accurately established, having in mind the exact contour of the test piece under consideration. A developed view of the drum 57 is shown in Fig. 15. In Fig. 15, the forward controlling indicia 56 are so located upon the surface of the offset drum 57 that the distance from the base line 113 to the indicia corresponding to each station represents the displacement that should be given to the probe arm 53 to bring the tip of the probe pin 69 to a position corresponding to the contour specified for the test part 32.

Below the base line 113 in Fig. 15 are formed a plurality of return indicia 56a, one for each of the twelve stations. The distance between the base line 113 and each of the indicia 56a is preferably so chosen that the distance between each forward controlling indicia 56 and the corresponding return controlling indicia 56a is substantially constant, so that the probe 47 tends to hug the contour of the test part 32. Thus the stylus 47 moves a minimum distance away from the test part 32 after each contact, so that relatively high speeds of operation may be obtained.

Initially, it will usually be necessary to set the probe 47 and the test part 32 at the proper starting positions. In the case of the probe 47, this may be accomplished by setting the switch 116 of the electrical control system (Fig. 16) to the manual position with the movable contact 117 engaging the fixed contact 118. This connects the power line 119 through the conductor 120 to the movable contacts 121 and 122 (Fig. 17) of the probe motor and stations motor manual switches 123 and 124, respectively.

To cause the motor 50 to rotate in one direction, the movable contact 121 of the switch 123 is moved into engagement with the fixed contact 125 to complete a circuit from the power line 119 (Fig. 16) through the movable switch contact 117, the fixed contact 118, the conductor 120, the movable switch contact 121 (Fig. 17), the fixed contact 125, the conductor 126, a limit switch 127, the conductor 128 and the relay 129 to the power line 130, thus energizing the relay 129. Energization of the relay 129 causes its normally open movable contacts 131, 132 and 133 to engage the fixed contacts 134, 135 and 136, respectively, supplying three phase A. C. to the probe motor 50 and causing it to rotate in one direction. Simultaneously, the normally closed movable relay contact 137 disengages the fixed contact 138, preventing possible energization of the relay 143 by inadvertent operation of the plugging switch 152.

For opposite rotation of the motor 50, the switch contact 121 (Fig. 17) is moved into engagement with the fixed contact 139 to complete a circuit from the power line 119 (Fig. 16) through the movable switch contact 117, the fixed contact 118, the conductor 120, the movable switch contact 121, the fixed contact 139, the conductor 140, the limit switch 141, the conductor 142, and the relay 143 to the power line 130. This energizes the relay 143 and causes the normally open movable contacts 144, 145 and 146 thereof to engage the fixed contacts 147, 148 and 149, thereby applying three phase A. C. of opposite phase rotation to the motor 50 so that it rotates in the opposite direction. Simultaneously, the normally closed movable relay contact 150 is disengaged from the fixed contact 151, preventing possible energization of the relay 129 by inadvertent closing of the plugging switch 152.

For accurate operation, it is essential that the motor 50 be brought to rest as soon as possible without coasting. This may be accomplished in any desired manner, as, for example, by the use of a conventional plugging switch 152 in conjunction with the circuits shown in Fig. 17. In switches of this general type, a movable switch contact 153 is maintained out of engagement with the fixed contacts 154 and 155 when the motor 50 is at rest. When the motor is rotating, the movable contact 153 engages one or the other of the fixed contacts 154 and 155, depending on the direction of rotation.

For an understanding of the operation of the plugging switch 152, let it be assumed that the probe motor switch contacts 121 and 125 are opened after having been closed to cause rotation of the probe motor 50 in one direction. This deenergizes the relay 129 and closes the contacts 137 and 138 thereof. The movable contact 153 of the plugging switch 152 engages the fixed contact 154 thereof while the motor 50 is rotating in this direction so that a circuit is completed from the power line 119 through the conductor 156, the movable plugging switch contact 153 engaging the fixed contact 154, the movable contact 137 engaging the fixed contact 138 on the relay 129, and the relay 143 to the power line 130. Completion of this circuit energizes the relay 143 causing three phase A. C. of opposite phase rotation to be applied to the motor 50 so that it is quickly brought to rest. When rotation ceases, the plugging switch movable contact 153 disengages the fixed contact 154, thus deenergizing the relay 143.

A similar plugging operation occurs when the probe motor switch contacts 121 and 139 are opened to bring the motor to rest after rotation in the opposite direction. In such case, deenergization of the relay 143 closes the contacts 150 and 151 while the plugging switch contacts 153 and 155 are engaged. This momentarily energizes the relay 129, applying three phase A. C. of proper phase to brake the motor 50 to a stop, whereupon the plugging switch contacts 153 and 155 are opened.

Similar circuits are provided for manual control of the motor 40 and corresponding parts have been designated by primed reference characters in Fig. 17. Manual operation of the motor 40 is essentially the same as for the motor 50 and it will not be necessary to include a detailed description thereof herein.

After the probe 47 has been located at the proper starting position with respect to the test piece 32 by manual operation of the motors 40 and 50 in the manner indicated above, the switch 116 (Fig. 16) is moved to the automatic position. In this position, the contacts 117 and 118 are open while the contacts 156 and 157 are closed.

The closing of the contacts 156 and 157 connects the conductor 168 to the power line 119, and when the start push button 158 is actuated, the conductor 168 is connected in series with the relay 159 to the power line 130. This energizes the relay 159 and closes the holding contacts 160 thereof so that it remains energized when the start push button 158 is released.

In moving to the automatic position, the movable switch contact 161 of the automatic manual switch 116 momentarily engages the fixed contact 162. This momentarily completes a circuit from the power line 119 through the engaged switch contacts 161 and 162, the conductor 163 and the relay 164 to the power line 130, thus energizing the relay 164. The holding contacts 165 of the relay 164 close and maintain the latter energized when the contacts 161 and 162 of the automatic manual switch are again broken as the switch is moved to the automatic position. The contacts 166 and 167 of the relay 164 are also closed when the latter is energized.

The closing of the contacts 166 of the relay 164 completes a circuit from the power line 119 through the engaged contacts 156 and 157 of the switch 116, the conductor 168, the normally closed stop button 169, the go-no-go switch 68, the conductor 170, the closed contacts 160 of the relay 159, the conductors 171 and 172, the closed contacts 166 of relay 164, the conductor 173, the conductor 128 (Fig. 17) and the relay 129 to the power line 130. This energizes the relay 129, causing its contacts to close and to apply three phase A. C. to the motor 50. The motor 50 then rotates in the proper direction to cause the probe 47 (Fig. 8) to advance in the direction of the test part 32.

Figure 15A:
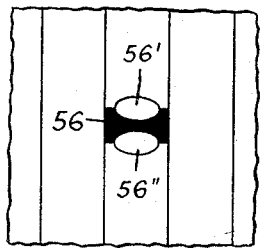
Fig. 15a is an enlarged view of a portion of the probe control drum, showing one of the indicia thereon.

Rotation of the motor 50 simultaneously drives the drum 57 in the proper direction to cause the forward controlling indicia 56 for the No. 1 station to approach the forward scanning mechanism 55. If the apparatus is properly adjusted, the leading edge 56' of the indicia 56 (Fig. 15a) for the No. 1 station will intercept the light beam from the scanning mechanism 55 (Fig. 8) a short time before the probe pin 69 (Fig. 9) reaches the position corresponding to the correct contour for the test part 32. When this occurs, the scanning mechanism 55 generates an electric signal which is fed through the conductors 175 to a photocell amplifier 176 (Fig. 12).

The signal from the scanning mechanism 55 overcomes the cut-off bias maintained on a triode 73 in the amplifier 176 by the series resistors 74 and 75 and the photocell load resistor 203 which are energized from the source of plate supply (not shown). This renders the tube 73 conducting so that a relay 177 connected in the plate circuit thereof by the conductors 178 is energized (Figs. 12 and 16). Energization of the relay 177 (Fig. 16) closes its normally open contacts 179 and 180, thus energizing circuits for operating the clutch (Fig. 11) to begin driving the stylus 62, as described below.

The closing of the contacts 179 completes a circuit from the power line 130 through the holding relay 182, the conductor 183, the closed contacts 179 of the relay 177, the conductor 184, the normally closed contacts 185 of the deenergized relay 186, the conductors 187, 188 and 168 and the closed contacts 156 and 157 of the switch 116 to the power line 119, thus energizing the holding relay 182. This closes the normally open relay contacts 189 and 190 and opens the normally closed contacts 191.

The closed contacts 189 are holding contacts which maintain the holding relay 182 energized through a circuit traced from the power line 130 through the relay 182, the closed contacts 189, the normally closed contacts 185 of the deenergized relay 186, the conductors 187, 188 and 168, and the closed contacts 156 and 157 of the switch 116 to the power line 119.

The closing of the contacts 180 of the relay 177 energizes the holding relay 192 through a circuit which is traced from the power line 119 through the closed contacts 156 and 157 of the switch 116, the conductor 193, the normally closed contacts 194 of the deenergized relay 195, the conductor 196, the closed contacts 180 of energized relay 177, the conductor 197, the closed contacts 167 of energized relay 164, the conductor 198, and the relay 192 to the power line 130. Energization of the relay 192 closes its holding contacts 199 which maintain it energized through a circuit including the closed contacts 199, the conductor 200, the closed contacts 194 of energized relay 195, the conductors 193 and 168, the closed switch contacts 156 and 157 and the power line 119.

The conductor 198, which is now connected to the power line 119, is also connected to one terminal of the solenoid 109 (Fig. 10), the other terminal of which is connected to the power line 130 by a conductor 198a. As a result, the solenoid 109 (Fig. 10) is energized and moves the coupling member 98 into clutching engagement with the sleeve coupling 96 on the shaft 92. This completes a driving connection between the stylus carrying rack 63 and the gear reduction mechanism 50a (Fig. 8) so that the stylus 62 begins to move across the record strip 59 in proportion to the displacement of the probe 47.

As the light spot from the forward scanning mechanism 55 (Fig. 8) leaves the trailing edge 56" of the indicia 56 on the drum 57 (Fig. 15a) the cutoff bias imposed on the triode 73 (Fig. 12) again becomes effective so that the triode 73 ceases to conduct and deenergizes the relay 177, opening its contacts 179 and 180. The cutting off of the triode 73 produces a positive pulse in the plate circuit thereof which is transmitted through a coupling circuit comprising the series condenser 76 and the shunt resistor 77 to the grid of a conventional triode 78. The positive pulse thus transmitted overcomes the cut-off bias maintained on the tube 78 by the resistors 79 and 80 which are energized from the source of plate supply (not shown). As a consequence, the tube 78 becomes conducting and discharges a condenser 80 that was previously charged through a resistor 81 connected to the source of plate supply (not shown).

The discharging of the condenser 80 produces a positive pulse which is transmitted through a coupling circuit including the series condenser 82 and the shunt resistor 83 to the grid of a conventional triode 84. This overcomes the cut-off bias maintained on the grid of the triode 84 by the resistors 85 and 86 which are energized from the source of plate supply (not shown). The triode 84 now conducts so that a current pulse passes from the recording stylus 62 through the Teledeltos record strip 59 and its conducting platen 87 which are in the plate circuit of the triode 84, producing a mark 205 on the record strip 59 (Fig. 18). Preferably, a current limiting resistor 88 should be interposed in series with the stylus 62 as shown, to limit the recording current to a relatively small value.

It will be noted that the opening of the contacts 179 and 180 does not affect the holding relays 182 and 192 since the latter are maintained energized by their holding contacts 189 and 199, respectively.

The advancement of both the probe 47 and the stylus 62 continues until the probe pin 69 (Fig. 9) engages the test part 32 at the No. 1 station. When this occurs, a circuit is completed (Fig. 12) from the positive terminal of the plate voltage supply (not shown) through a current limiting resistor 89, the test part 32 and the probe pin 69 to the grid of a standard type triode 181 in an amplifier 205, a grid resistor 201 being connected from the grid of the triode 181 to ground. This applies a positive voltage to the grid of the tube 181 which overcomes the cut-off bias normally maintained thereon by the resistors 202 and 207, which are connected between ground and the positive lead of the plate supply (not shown). The triode 181 thus becomes conducting and supplies current through the conductors 206 to the relay 195. Energization of the relay 195 closes its normally open contacts 208 and opens its normally closed contacts 194 (Fig. 16).

The positive voltage pulse produced upon engagement of the probe pin 69 with the test part 32 is also applied by a conductor 398 to the control grid of a conventional triode 399. This overcomes the cut-off bias normally maintained on the triode 399 by the resistors 79 and 80, so that the triode 399 becomes conducting and discharges a condenser 400 that was previously charged through a resistor 401 by the plate voltage supply (not shown). The discharging of the condenser 400 produces a positive voltage pulse which is applied to the grid of the triode 84, causing a second mark 206 to be made on the record strip 59 (Fig. 18).

As stated, the transverse distance between the marks 205 and 206 on the strip 59 in Fig. 18 is an accurate measure of the deviation of the contour of the test part 32 at the No. 1 station from the true contour desired for that station. Since the mark 206 was made after the mark 205, the offset of the test part 32 from the chord line 110 (Fig. 14) is less than the ideal off-set specified.

It will be understood that the record strip 59 may be provided with standard markings 207 and 208 representing minimum and maximum tolerance values, respectively, for the test part 32.

The opening of the contacts 194 of the relay 195 (Fig. 16) deenergizes the holding relay 192, thus deenergizing the solenoid 109 (Fig. 11). The spring 103 then disengages the coupling member 98 from the sleeve coupling 96 enabling the stylus arm 63 to be returned to its initial position by the spring 207.

The closing of the contacts 208 of the relay 195 completes a circuit from the power line 130 through the relay 208a, the conductor 209, the closed contacts 208 of the relay 195, the conductor 210, the closed contacts 185 of the deenergized relay 186, the conductors 187, 188 and 168, and the closed switch contacts 156 and 157 to the power line 119. This energizes the relay 208a, closing its normally open contacts 211 and 212 and opening its normally closed contacts 213.

The closing of the contacts 211 connects the conductor 209 directly to the closed contacts 185 of the deenergized relay 186, thus maintaining the relay 208a temporarily energized.

Since both of the relays 182 and 208 are now energized and their normally closed contacts 191 and 213 are open, the energizing circuit for the relay 164 is broken and the latter is deenergized. Hence, the contacts 166 thereof are opened, deenergizing the probe motor relay 129 (Fig. 17).

Meanwhile, the closing of the contacts 212 of the relay 208 energizes the relay 186 through a circuit traced from the power line 130, through the relay 186, the conductor 214, the closed contacts 190 of the energized relay 182, the conductor 215, the closed contacts 212 of the energized relay 208, the conductors 216 and 217, the normally closed contacts 218 of the deenergized relay 219, the conductors 220, 188 and 168, and the closed switch contacts 156 and 157 to the power line 119.

Energization of the relay 186 closes its normally open contacts 203, 221 and 222 and opens its normally closed contacts 185. The closing of the contacts 221 holds the relay 186 temporarily energized by connecting one terminal thereof directly to the conductor 217 as shown in Fig. 16. With the closing of the contacts 203, a resistor 402 is connected by the conductors 203a in shunt with the photocell in the scanning mechanism 55 (Fig. 12) rendering the latter ineffective to respond to indicia on the drum 57. Hence, no mark is made on the record strip 59 when the forward controlling indicia 56 again passes beneath the scanning mechanism 55 during the return movement of the drum 57 as described below.

The closing of the contacts 222 completes a connection from the power line 119 through the closed switch contacts 156 and 157, the conductors 168 and 170, the closed contacts 160 of the energized relay 159, the conductors 171 and 172, the closed contacts 222 and the conductor 223 to one terminal of the relay 143 (Fig. 17), the other terminal of which is connected to the power line 130. This energizes the relay 143, causing three phase A. C. of opposite phase rotation to be applied to the motor 50 so that it rotates in the opposite direction and drives the probe 47 away from the test part 32 (Fig. 8).

Simultaneously with the movement of the probe 47 away from the test part 32 (Fig. 8), the drum 57 rotates in the reverse direction until the return controlling indicia 56a thereon for the No. 1 station intercepts the beam of the return scanning mechanism 54. When this occurs, the return scanning mechanism 54 generates a signal which is fed by the conductor 224 (Fig. 8) to a conventional photocell amplifier 225, the output of which is fed to the relay 219 (Fig. 16) through the conductors 226. Energization of the relay 219 closes the normally open contacts 227 and opens the normally closed contacts 218 thereof. The opening of the contacts 218 breaks the circuit to the probe relay 143, so that the motor 50 is deenergized and plugged to a stop.

The closing of the contacts 227 energizes the holding relay 228, the record strip feed motor 60, and the solenoid 331 which advances the scanning mechanisms 54 and 55 (Fig. 8), through a circuit traced from the power line 130 through the conductor 229, the relay 228, the motor 60 and the solenoid 331 in parallel, the conductor 230, the closed contacts 227, the conductor 231, the normally closed contacts 232 of the deenergized relay 233, the conductors 234 and 168, and the closed switch contacts 156 and 157 to the power line 119. This closes the normally open contacts 235 and 236 of the relay 228 and simultaneously advances both the record strip 59 and the scanning mechanisms 54 and 55, one step (Fig. 8) so that the latter are moved axially of the drum 57 to the No. 2 station position. The closed contacts 235 maintain the relay temporarily energized by connecting one terminal thereof directly to the conductor 231 by a conductor 238.

The engagement of the contacts 236 completes a circuit from the power line 119, through the closed switch contacts 156 and 157, the conductor 168, the normally closed stop button 169, the go-no-go switch 68, the conductor 170, the closed contacts 160 of the energized relay 159, the conductors 171 and 239, the closed contacts 236, the conductor 239a and the relay 143' (Fig. 17) to the power line 130. This energizes the motor 40, rotating both the drum 42 and the lead screw 39 which drives the carriage 37. Rotation of the motor 40 continues until the next indicia 43 on the drum 42, corresponding to the No. 2 station, intercepts the beam from the scanning mechanism 44. When this happens, a signal is generated by the scanning mechanism 44 and is fed through the conductors 240a to a conventional photocell amplifier 241, the output from which is supplied through the conductor 242 to relay 233 (Fig. 16). This closes the normally open contacts 234 and opens the normally closed contacts 232.

The opening of the contacts 232 breaks the circuit from the power line 119 to the relay 228 and the paper feed motor 60. This causes the contact 236 of the relay 228 to open, breaking the circuit energizing the relay 143' (Fig. 17) and deenergizing the motor 40.

The closing of the contacts 234 of the relay 233 energizes the relay 164 through a circuit traced from the power line 130, through the relay 164, the conductor 243, the closed contacts 234, the conductor 244, the conductor 245, the normally closed contacts 191 of the deenergized relay 182, the conductors 188 and 168, and the closed switch contacts 156 and 157, to the power line 119. Energization of the relay 164 results in energization of the motor 50 in the proper direction to advance the probe 47 in the direction of the test part 32 as described above.

The cycle of operations outlined above is then automatically repeated until a plurality of marks 205 and 206 have been made on the record strip 59 (Fig. 18) representing the ideal and actual contours, respectively, for the test part 32. As stated, the transverse distance between any mark 205 and the corresponding mark 206 at any station is an accurate measure of the deviation of the contour of the test part 32 from the ideal contour desired at that station.

As stated, a no-go switch can be provided which is adapted to be actuated whenever the tolerance limits for the test piece are exceeded. Thus, in Fig. 8, the no-go switch 68 may be adapted to be actuated by the pin 67 on the stylus arm 63 when the latter has been advanced to bring the stylus 62 to a position beyond the minimum tolerance line 207 on the record strip 59 (Fig. 18). The switch 68 may be connected in the line 170 (Fig. 16) so that actuation thereof will shut down the apparatus. It will be understood that the switch 68 may be adapted to be actuated under other conditions, as desired.

In order to insure accurate stopping of the motors 40 and 50, respectively, it is essential that they be geared down to a relatively high degree. If the resulting speed of operation is not fast enough, the gauging operation can be speeded up without sacrificing accuracy by using a two motor system such as is shown in Fig. 19. While a system of this type can be used either for moving the probe 47 or the test part 32, only the latter embodiment will be described and illustrated herein, for example.

Referring to Fig. 19, low speed and high speed motors 246 and 247, respectively, supply two inputs to a conventional mechanical differential 248 through suitable gear boxes 249 and 250, respectively. The output at the shaft 251a of the differential 248 is the sum of the outputs of the gear boxes 249 and 250 and it may be used to drive the drum 42 and the test part carriage 37 (Fig. 8) for example. The motors 246 and 247 may be controlled by suitable identical control systems designated generally by the boxes 251 and 252, which may be substantially like the control system shown in Fig. 17 for the motor 40.

For proper operation of the two motor system shown in Fig. 19 each of the indicia 43 on the drum 42 (Fig. 8) is made broad enough to enable the high speed motor 247 to be plugged to a stop in slightly less than the time required for the indicia 43 to pass under the beam of the scanning means 44. Also, the relay 233 is provided with additional normally closed contacts 254 and normally closed contacts 255.

When the drum 42 is to be moved from one station to the next, the relay 256 is energized by a circuit including the conductor 239a, the closed contacts 254 of the deenergized relay 233, the conductor 253, and the power line 130. Energization of the relay 256 closes its contacts 257 and 258 energizing both control systems 251 and 252 by connecting them to the conductor 239a through the conductors 239b and 239c, respectively. This causes both motors 246 and 247 to be energized so that the speed of the differential shaft 259 is the sum of the speeds of the gear boxes 249 and 250.

When the scanning mechanism 44 intercepts the leading edge of the broad indicia 43, the relay 233 is energized from the amplifier 241 through the conductors 242.

Energization of the relay 233 opens its normally closed contacts 254 and closes its normally open contacts 255. The opening of the contacts 254 deenergizes the relay 256, thereby opening its contacts 257 and 258. This acts to deenergize the high speed motor 247 by breaking the control circuit which energizes the control system 252 at the contacts 257.

Meanwhile, the low speed motor 246 continues to rotate since the circuit to its control system 252 is still maintained closed by the closing of the contacts 255 on the relay 253. Rotation of the motor 247 continues until the lagging edge of the indicia 43 on the scanning drum 42 passes beyond the scanning mechanism 44, at which point the relay 233 is deenergized, opening its contacts 255.

From the foregoing, it will be understood that while the drum 42 is being moved and the space between two adjacent indicia 43 is being scanned, both the low and high speed motors 246 and 247, respectively, are rotating. Hence, the shaft 259 of the differential 258 rotates at a relatively high speed, moving the test piece carriage 37 at a correspondingly high speed. When the leading edge of the next indicia 43 on the drum 42 intercepts the beam of the scanning mechanism 44, the high speed motor 247 is plugged to a stop. However, the low speed motor 246 continues to rotate until the lagging edge of the indicia 43 passes beyond the scanning beam of the scanning mechanism 44. By carrying out the end portion of the motion at low speed until the exact stopping point desired is reached, the test part carriage 37 can be rapidly moved from one station to another with a high degree of accuracy.

It will be understood that the two motor system described above can be used for controlling the motion of the probe 47, suitable provision being made for reversing the direction of the motors 246 and 247, as will be understood by those skilled in the art from the foregoing description of the single motor operation.

The single probe profile recorder described above will be of special utility in gauging laboratories where time is not of the essence and a high degree of accuracy is essential. Where time considerations are important, as in the gauging of parts in large scale production, it is preferred to use a multiprobe profile recorder of the type shown in Figs. 20–36, inclusive. In this embodiment, multiprobe units are provided, each of which carries a plurality of probes corresponding to a plurality of test stations, respectively. Further several multiprobe units may be provided for gauging the contours of opposite faces of the test part. Preferably, the probes comprising each of the two multiprobe units are so mounted that the loci of the points of each define the contours specified for the respective portions of the test part to be gauged.

Preferably, the two multiprobe units are moved simultaneously toward the test part and reference marks are made on a record strip when the tips of the opposed probes reach the points in space at which they should contact the adjacent surfaces of the test part, according to specifications therefor. Similar markings are made upon the record strip at the instant each probe engages the test part and the deviations of the contours of the test part can be determined by measuring the distances between the reference points and the corresponding points made on the record strip upon contact of the probes with the test part.

In a preferred embodiment, a plurality of gauging stations are provided so that the contours of the test part may be determined at a plurality of different levels, as desired.

Referring now to Figs. 20 and 21, the multiprobe apparatus may comprise, for example, a frame 259 having a table portion 260 on which is mounted a rotatable turn-table 261. The turn-table 261 is provided with a plurality of angularly spaced apart hangers 262 in which test parts 32 to be gauged are adapted to be received. The turn-table 261 is adapted to be driven by a shaft 263 journalled in a suitable support 264. Mounted on the shaft 263 is a gear 265 engaged by a pinion 266 driven by the motor 267 (Fig. 20).

As shown in greater detail in Fig. 24, each of the hangers 262 comprises an upper rod member 403 which extends through a bore 404 in the turn-table 261. The hanger 262 may be secured loosely to the turn-table 261 in any suitable manner as, for example, by means of a pin 405 passing through the rod member 403 as shown. The hanger 262 is provided with a downwardly extending pin 406 and two oppositely extending pins 407 and 408 which are adapted to cooperate with bores 409, 410 and 411, respectively, drilled into the test part 32 to retain the latter securely and accurately in a predetermined position. The pin 407 may be provided with a knob 412 by means of which it may be retracted against a spring 413 to facilitate insertion of the test part 32.

The hanger 262 is also provided with a base member 414 having opposed locating bores 415, 416 and 417 (Fig. 23) in the sides thereof which are adapted to cooperate with corresponding pins 418 on the gauging heads to insure accurate location of the test part 32 during the gauging operations, as described in greater detail below.

Rotation of the turn-table 261 moves the test parts 32 in the hangers 262 successively into operative relationship with three gauging heads 269, 270 and 271 (Fig. 21) at which the gauging operations are adapted to be simultaneously performed, preferably at different vertical positions along the test parts 32. The gauging heads 269, 270 and 271 are substantially identical and it will be necessary, therefore, to describe only one of them in detail herein.

Figure 22:
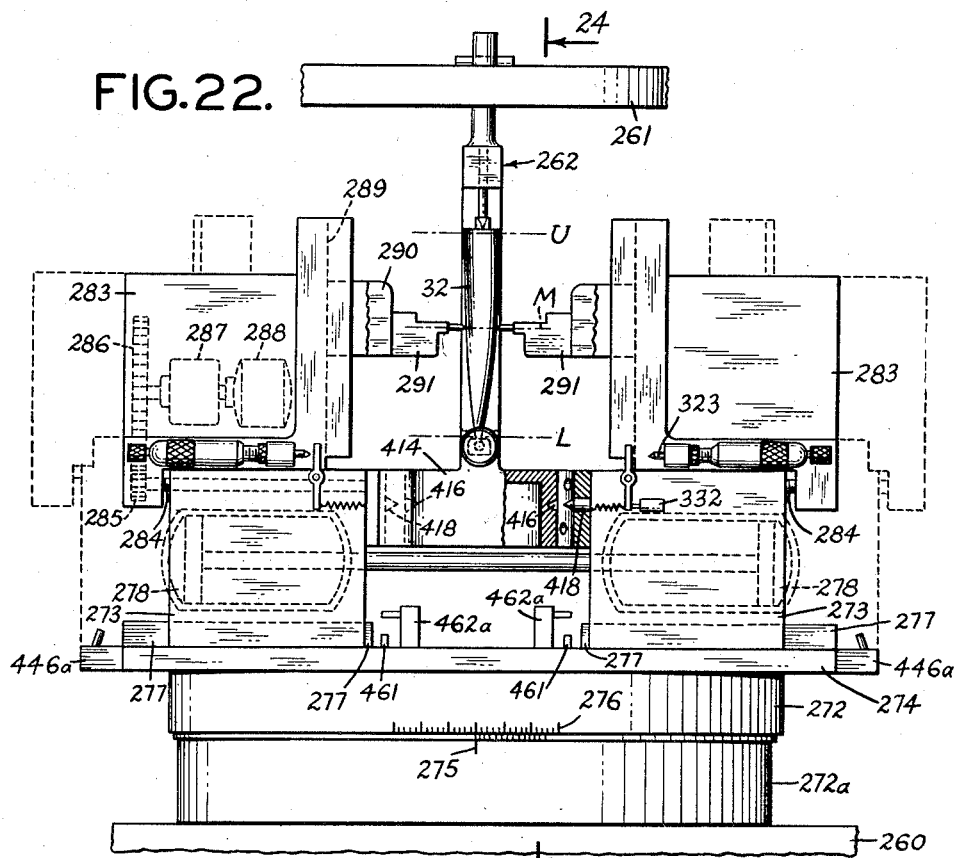
Figs. 22 and 23 are front and top views, respectively, of one of the gauging heads in the apparatus shown in Fig. 20.
Figure 23:
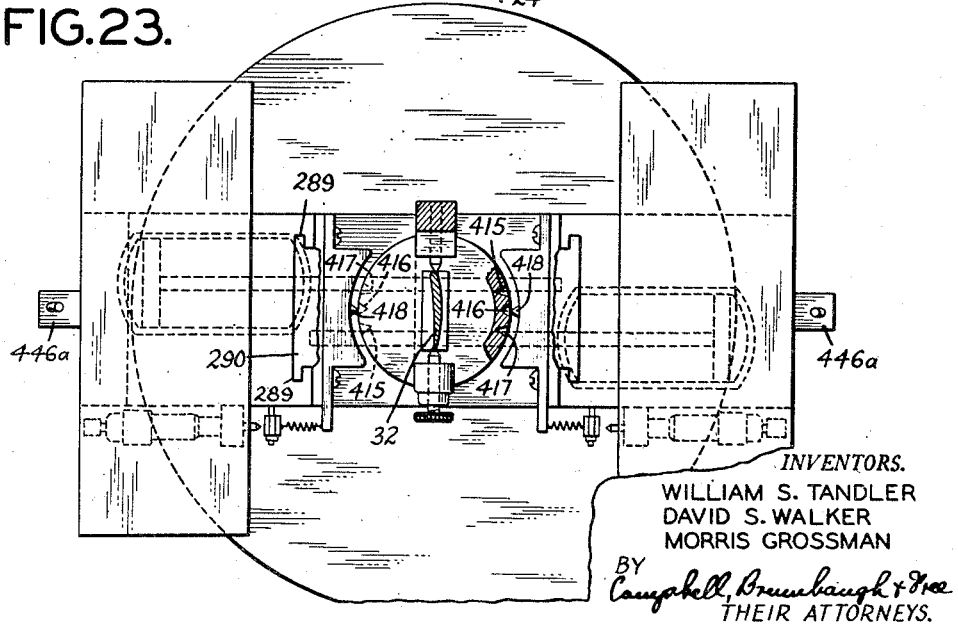

As shown in detail in Figs. 22 and 23, the gauging head 269 comprises a base member 272 rotatably mounted on a support 272a on the table portion 260 of the frame 259. The base member 272 is provided with an angular scale 276 thereon which is adapted to cooperate with an index mark 275 on the support 272a to facilitate positioning the head 269 in any angular position corresponding to the angular position of the chord line of the test part 32 at the level at which the gauging operation is to be performed. Conventional means (not shown) are also provided for securing the head 269 in any desired position to which it may be rotated.

On the base member 272 is a transverse frame 274 having parallel horizontal guideways 277 (Fig. 24) on which a pair of identical opposed carriages 273 are slidably mounted. The carriages 273 are adapted to be moved simultaneously and fairly rapidly either toward or away from one another in any suitable manner, as for example, by means of conventional hydraulic plunger mechanisms 278 controlled by valve means 279 (Fig. 29) interposed between a hydraulic power supply 280 and the supply conduits 281.

The carriages 273 are also provided with guideways 282 (Fig. 24) in which are slidably mounted identical opposed probe carriers 283. The probe carriers 283 are adapted to be moved toward and away from the test part 32 (Fig. 22) by means of the lead screws 284 carrying the pinions 285 engaging the gears 286 on the gear boxes 287 powered by the identical synchronous motors 288.

Each of the probe carriers 283 may be provided with vertical guideways 289 within which are slidably received supports 290 for the multiprobe units 291. Each multiprobe unit 291 may comprise, for example, upper and lower plates 292 and 293, respectively (Fig. 26), preferably made of suitable non-conducting material, between which a plurality of conducting probes 294 are adapted to be received in suitably V-shaped registering grooves 295. The upper and lower plates 292 and 293 may be held together so as to apply no or only slight pressure to the probes 294 in any suitable manner, as by means of the screws 296 (Fig. 25) for example.

Pivotally mounted on an insulated rod 297 journalled in the multiprobe unit 291 are a plurality of movable lever arms 298 of conducting material. The lever arms 298 have lower edges 299 adapted to rest against the rear ends of the probes 294, and upper edges 299a adapted to be engaged by a strip of flexible material 420 on a press bar 421. The press bar 421 is carried by an arm 422 mounted on a shaft 423 pivoted in the unit 291 as shown, and its purpose is to restore the pins 294 to their proper positions if they have been displaced by contact with the test part 32. To this end, the shaft 423 may be provided with a crank arm 423a adapted to be actuated by a rod 530 as described below in connection with the form of the invention illustrated in Fig. 35. Adjacent movable lever arms 298 may be separated by suitable insulating spacers 300 mounted on the rod 297 as shown. The movable lever arms 298 are also provided with spring wires 301 which extend laterally into notches 424 formed in conducting terminals 425.

Figure 25:
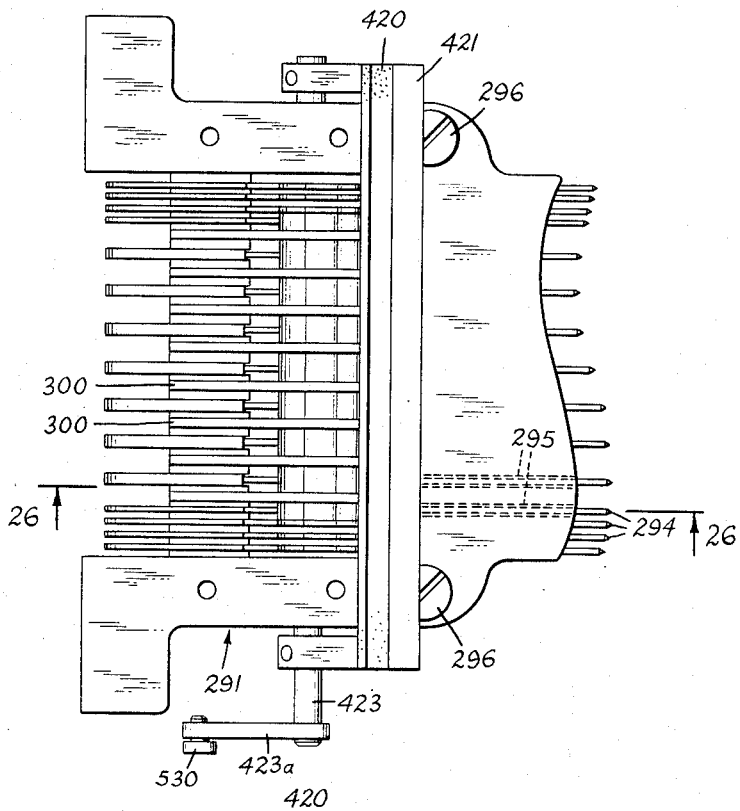
Figs. 25 and 26 are plan and end views, respectively, of a typical multiprobe unit.
Figure 26:
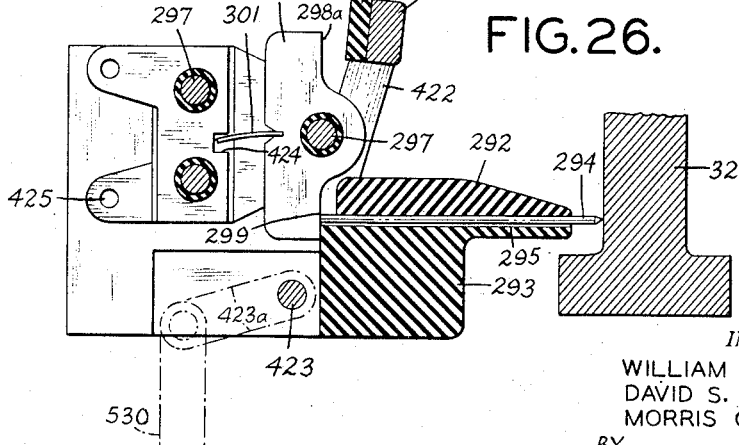

Preferably, the tips of the probes 294 lie along a curve which is identical with the contour of the surface of the test part 32 which is to be gauged, as illustrated in Fig. 25. Also, if desired, the forward edges of the upper and lower plates 292 and 293 may be shaped to conform with the contour of the surface to be gauged.

The recording apparatus 302 (Figs. 27 and 28) may be essentially the same as that used in the single probe embodiment, and it may comprise, for example, a conventional Teledeltos tape 303 driven in steps by a suitable motor 304a.

Records of the contours of the three test parts being gauged by the gauging heads 269, 270 and 271, respectively, are adapted to be made on the tape 303 by means of three separate recording units 304, 305 and 306, respectively. The recording units 304, 305 and 306 are preferably adapted to record upon the left, middle and right portions, respectively, of the record strip 303, so that the three records for any test part at the three test stations will be adjacent one another. Since the recording units 304, 305 and 306 are substantially identical in construction, it will be sufficient to describe only one in detail.

Figure 27:
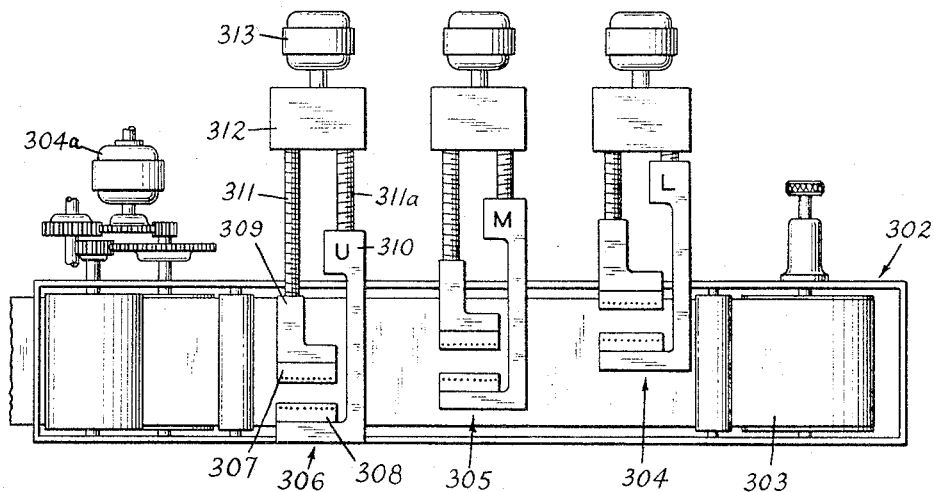
Figs. 27 and 28 are top and side views, respectively, of a recording system suitable for the multiprobe apparatus of Fig. 20.
Figure 28:
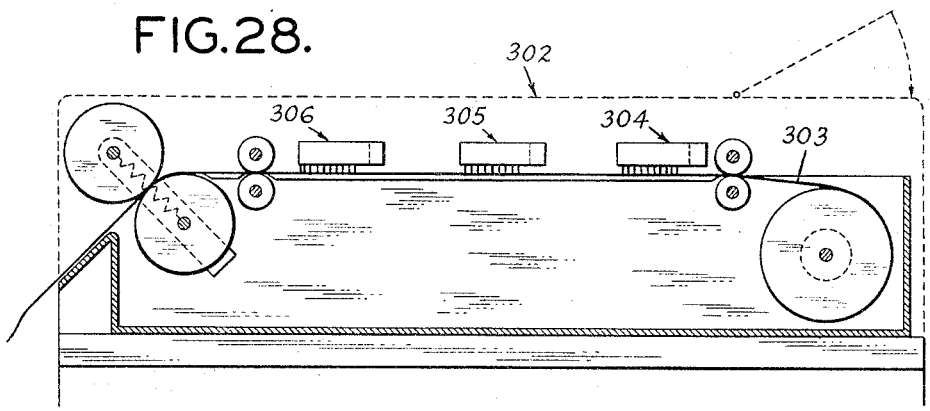

As shown in Fig. 27, the recorder 306 may comprise, for example, a pair of opposed multistylus units 307 and 308 which are adapted to be moved toward and apart from one another in synchronism with the movements of the corresponding opposed probe carriers 283 (Fig. 23). To this end, the multistylus units 307 and 308 are mounted on the carriages 309 and 310, respectively, which are adapted to be driven simultaneously toward or away from one another by means of the opposed lead screws 311 and 311a energized from a suitable gear box 312 driven by a synchronous motor 313. The synchronous motor 313 may be substantially identical with the synchronous motors 288 for the probe carriers 283 (Fig. 23) and they may be energized from a common source through a suitable electrical control system 314 (Figs. 29 and 30). Also, the gear ratios of the gear boxes 287 and 312 are preferably so chosen that the ratios of the displacements of the multistylus units 307 and 308 to the displacements of the corresponding probe carriers 283 are, say, one hundred to one.

The multistylus units 307 and 308 are identical and it will be necessary, therefore, to describe only the unit 308 in detail. As shown in Figs. 31 and 32, the multistylus unit 308 may comprise, for example, a plurality of styli 315 spaced apart in a common vertical plane lying perpendicular to the carriage 310 and secured thereto in any suitable manner, as by mounting them between two plate 316 and 317 secured together by means of the screws 318, for example. Preferably, the spacing between several styli 315 should correspond to the spacing between the probes 294 of the corresponding multiprobe unit 283.

Figure 33:
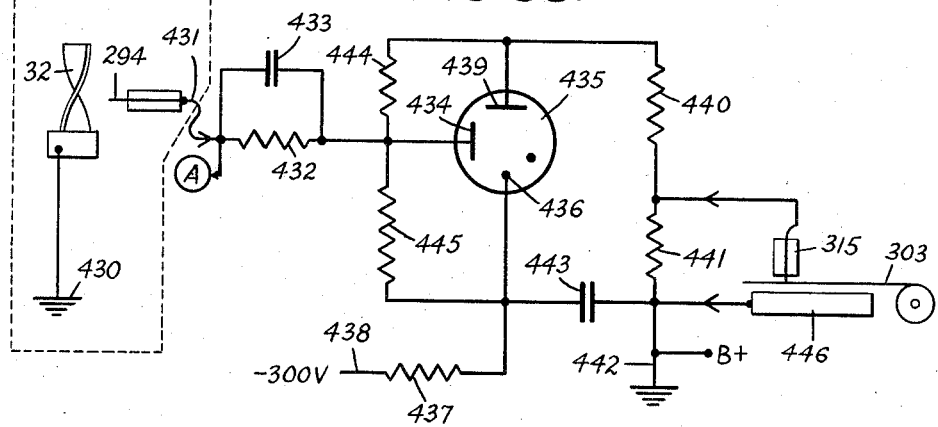
Fig. 33 is a schematic diagram of a typical recording amplifier.

For recording purposes, a plurality of amplifiers of the type shown in Fig. 33 may be employed. In Fig. 33, the test part 32 is connected to ground at 430 and the probe pin 294 is connected by a conductor 431 in series with a resistor 432 and a condenser 433 in parallel to the starter anode 434 of a conventional cold cathode gas discharge tube 435. The cathode 436 of the tube 435 is connected through a resistor 437 to the negative lead 438 of a suitable power supply (not shown) and the anode 439 is connected in series with the resistors 440 and 441 to the grounded positive terminal 442 of the power supply. A charging condenser 443 is connected between the resistor 437 and the grounded positive terminal 442 of the power supply. Also, the resistors 444 and 445 are connected between the anode 439 and the starter anode 434 of the tube 435, and the starter anode 434 and the cathode 436 of the tube 435, respectively. The corresponding recording stylus 315 and the Teledeltos record strip 303 in series are connected through the metal platen 446 in parallel with the resistance 441.

When the circuit shown in Fig. 33 is first energized from the power supply, the condenser 443 is charged through the resistor 437. So long as the probe pin 294 is out of engagement with the test part 32, the voltage divider comprising the resistors 444 and 445 maintains sufficient bias on the starter anode 434 of the tube 435 to render it nonconducting. When the probe pin 294 engages the test part 32, a positive voltage pulse is applied through the condenser 433 to the starter anode 434 of the tube 435 so that the latter becomes conducting, permitting the condenser 443 to discharge through the resistor 441 and the parallel branch including the stylus 315 and the Teledeltos record strip 303. As is well known, the passage of current through the Teledeltos record strip 303 produces a clearly legible mark thereon.

After the condenser 443 has been discharged, its voltage drops to a value too low to maintain conduction through the tube 435 so that the latter is extinguished. The condenser 443 then recharges and is available for making another mark on the record strip 303 when the circuit is again closed by engagement of the probe pin 294 with the test part 32. The condenser 433 serves the purpose of providing only a single pulse to the starter anode 434 when the probe pin 294 touches the test part 32. The parallel resistor 432 serves to provide a discharge path for the condenser 433 when the probe pin 294 is disengaged from the test part 32 to prepare the circuit for a subsequent probing operation.

An amplifier of the type shown in Fig. 33 is connected between each of the probes 294 of the pairs of multiprobe units at the three gauging stations 269, 270 and 271 (Fig. 21) and the corresponding styli 315 on the pairs of multistylus units of the three recording units 304, 305 and 306 (Fig. 27).

Figure 13:
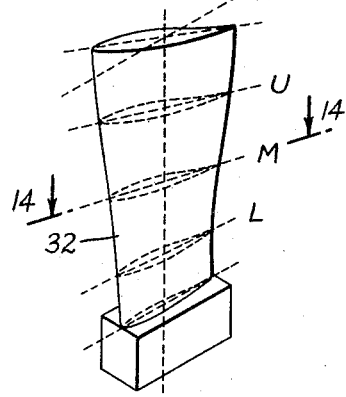
Fig. 13 is a view in perspective of a typical test part such as a turbine blade, for example.

In setting up the apparatus shown in Figs. 20–36 to gauge test pieces such as turbine blades of the type shown in Fig. 13, all that is required is to provide multiprobe units of proper design and to adjust the apparatus in accordance with specifications for the part. Preferably, the parts are gauged at a plurality of different levels such as the levels U, M and L in Fig. 13. To this end, the slides 290 (Fig. 22) of the three gauging heads 269, 270 and 271 are adjusted to bring the multiprobe units 291 carried thereby to the proper levels U, M and L, respectively, and the multiprobe units 291 are shaped to conform with the contours of the parts at the three respective levels. Also, the angular positions of the respective gauging heads 269, 270 and 271 are adjusted to bring the lines of movement of the respective multiprobe units into perpendicularity with the chord lines of the test piece at the levels U, M and L, respectively.

In operation of the multiprobe apparatus shown in Figs. 20–36 of the drawings, the turn-table 261 is rotated in steps through angles equal to the angular displacements between the gauging heads 269, 270 and 271 and an operator clamps a test part 32 in each of the hangars 262 as they come to rest before him.

After leaving the operator's position, each test part passes through a safety gate 319 and comes to rest alongside of a conventional numbering device 320 which applies an identifying number to each part. Simultaneously, another conventional numbering device 321 (Fig. 21) applies a corresponding number to the record strip 303. The record strip 303 is advanced in steps in synchronism with the corresponding stepped rotation of the turn-table 261 as described in greater detail below, so that successive portions of the record strip 303 carry consecutive numbers corresponding to the consecutive numbers carried by consecutive test parts 32 on the turn-table 261.

The safety gate 319 may comprise, for example, a conventional microswitch 322 which is adapted to be actuated to shut down the apparatus when a test part that is greatly oversize or that has been improperly clamped in one of the hangars 262 tries to pass therethrough.

Each time the turn-table 261 is brought to rest after having been advanced one step, the multiprobe units 291 on each of the gauging heads 269, 270 and 271 are simultaneously advanced towards the test parts 32 supported therebetween. Also, the recording units 304, 305 and 306 operate simultaneously to move the multistylus units 307 and 308 of each recording unit towards one another in proportion to the displacements of the corresponding multiprobe units. Upon arrival of the probes 294 at the locations where they should engage the faces of the test parts, in accordance with specifications, switches are actuated which cause the recording units 304, 305 and 306 to record reference marks upon the adjacent portions of the record strip. Finally, upon engagement of the probes 294 of the multiprobe units 291 with their respective test parts, the recording units 304, 305 and 306 make other characteristic marks on the record strip.

Since the gauging heads operate in substantially the same manner, it will be necessary to outline briefly the manner of operation of only one of them, namely, the gauging head 269.

Initially it will be assumed that the fast travel carriage 273 is in its retracted position holding the contacts 446 and 447 on the retract limit switch 446a (Figs. 23, 29 and 30) closed and that the turn-table motor 267 (Fig. 20) has just come to rest after having moved the test parts 32 through one step, so that the indexing switch 448 (Figs. 20 and 30) is in the actuated position with its movable contact 449 engaging the fixed contact 450. The switch 448 may be of conventional form in which the movable contact 449 is normally urged into engagement with a fixed contact 515 but engages the fixed contact 450 when actuated.

The sequence of operations is initiated by closing the power switch 451 (Fig. 30). This supplies power from the power line 452 through the movable contact 449 of the switch 448 engaging the fixed contact 450, a conductor 453, the normally closed contacts 454 of a relay 455, the conductor 456, the hydraulic valve solenoid 457 and the conductor 458 to the power line 459. Energization of the solenoid 457 opens the hydraulic valve 279 (Fig. 29) supplying hydraulic fluid to the hydraulic piston mechanism 278 (Figs. 23 and 29) and causing the latter to push the fast traverse carriage 273 forward until it engages the front stop 461 and closes the contacts 462 and 463 on the forward limit switch 462a.

At this time, the pins 418 on the opposed carriages 273 enter the appropriate bores 415, 416 or 417 in the base member 414 of the hanger 262, thus securing the part 32 accurately in the proper position for gauging.

In the initial position, it will be observed that the relay 464 (Fig. 30) is energized by a circuit traced from the power line 452, through the conductors 465 and 466, the normally closed contacts 467 of the relay 468, the conductors 469 and 470, the closed retract limit switch 446, and the relay 464 to the power line 459. Once energized, the relay 464 is held energized by the closing of its contacts 471 which are connected to the conductor 470.

The closing of the contacts 462 forward limit switch 462a completes a circuit from the power line 452 through the movable switch contact 449 engaging the fixed contact 450, the conductor 453, the closed contacts 462, the conductor 472 and the relay 455 to the power line 459. This energizes the relay 455, opening its normally closed contacts 454 and closing its normally open contacts 474, 475 and 509. The closing of the contacts 475 completes a circuit to the conductor 453, thus maintaining the relay 455 energized after the forward limit switch 462 has been opened.

The closing of the contacts 463 of forward limit switch 462a completes a circuit from the power line 452 through the conductor 465, the closed contacts 463, the conductor 476, the closed contact 477 of the energized relay 464, the conductors 473, 478 and 479, the normally closed contacts 480 of the deenergized relay 481, the conductor 482, the stylus motor 313, the conductor 484, the normally closed contacts 485 of the deenergized relay 481 and the conductor 486 to the power line 459. Simultaneously, a branch circuit is completed from the conductor 476 through the closed contacts 487 of the energized relay 464, the conductor 488, the conductors 489 and 490, the normally closed contacts 491 of the deenergized relay 468, the conductor 492, the probe motor 288, the conductor 494, the normally closed contacts 495 of the deenergized relay 468 and the conductor 496 to the power line 459. Thus, both the motors 288 and 213 are energized and since they are synchronous motors they drive the multiprobe unit 291 and the multistylus unit 304 synchronously in the forward direction.

Figure 34:
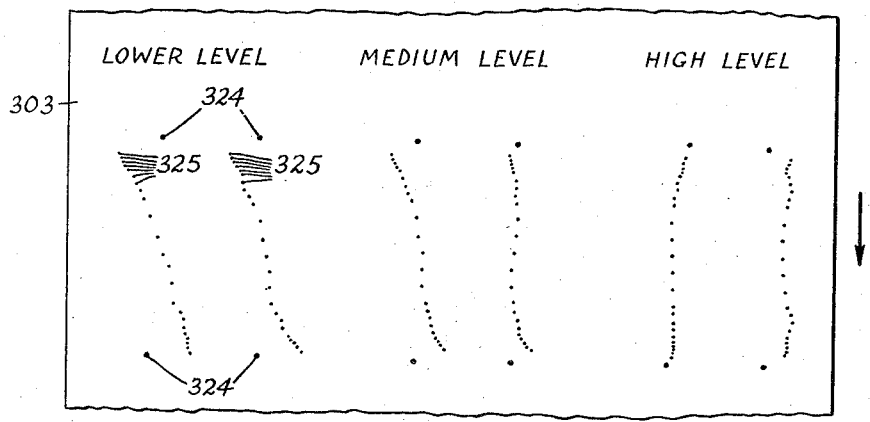
Fig. 34 shows several representative records such as might be obtained with the apparatus of Figs. 20-32, inclusive.

When the tips of the probes 294 on the multiprobe unit 291 have reached the position at which they should engage the face of the test part 32, in accordance with specifications for the part, a sensitive switch 332 on the fast traverse carriage 273 (Figs. 22 and 29) is actuated by an actuator 323 mounted on the probe carriage 273. The closing of the switch 332 grounds the starter anode circuit of the amplifiers connected to the two outermost styli 315 (Fig. 31) of the multistylus units 307 and 308, causing the latter to produce spaced apart markings 324 on the record strip 303 (Fig. 34). At this time the multistylus units 307 and 308 (Fig. 27) are advancing toward one another.

The multiprobe units 291 continue to move forwardly until the probes 294 thereon engage the test part 32. As soon as a probe 294 engages the test part 32, the stylus 315 corresponding thereto is energized by its amplifier and it produces a characteristic mark 325 on the record strip 303 (Fig. 34).

Forward movement of the probe carriage 283 continues until the forward end thereof (Fig. 29) engages and closes a forward limit switch 327. The closing of the limit switch 327 completes a circuit from the power line 452 through the conductor 465, the closed limit switch 463, the conductor 476, the normally closed retract limit switch 327a, the closed limit switch 327, the conductor 497 and the relay 468 to the power line 459. This energizes the relay 468, opening its normally closed contacts 495, 491 and 467 and closing its normally opened contacts 498, 499 and 500. The closing of the contacts 500 connects the relay 468 directly to the conductor 476 so that the relay 468 is maintained energized in case the switch 327 is opened.

The closing of the contacts 498 and 499, respectively, reverses the connections between the conductors 494 and 492, respectively and the power lines 452 and 459, thus causing the probe motor 288 to reverse its direction of rotation and retracting the carriage 273.

In similar fashion, the stylus motor 313 rotates in the forward direction until the stylus carriage 310 engages and closes the forward limit switch 501 (Figs. 29 and 30). This completes a circuit from the power line 452, the closed forward limit switch 463, the conductor 476, the normally closed retract limit switch 502, the closed forward limit switch 501, the conductor 503, and the relay 481 to the power line 459, thus energizing the relay 481. Energization of the relay 481 opens its normally closed contacts 485 and 480 and closes its normally open contacts 504, 505, 506 and 507.

The closing of the contacts 507 connects the relay 481 directly to the conductor 476 so that it remains energized in case the limit switch 501 is opened.

The closing of the contacts 504 and 505 reverses the connections between the conductors 484 and 482, respectively, and the power lines 452 and 459 so that voltage of opposite phase rotation is supplied to the stylus motor 313 and it begins to rotate in the reverse direction.

When the normally closed contacts 467 on the relay 468 were opened, the circuit to the relay 464 was broken so that the latter was deenergized, opening its contacts 477, 487 and 471 and closing its contacts 508. Since the relay 455 is energized while the relay 464 is deenergized, a circuit is completed from the power line 452 through the movable switch contact 449 engaging the fixed contact 450, the conductor 453, the closed contacts 509 on the energized relay 455, the conductor 510, the normally closed contact 508 on the deenergized relay 464, the conductor 511, the retract hydraulic valve solenoid 512, and the conductor 458 to the power line 459. This energizes the solenoid 512, operating the valve 279 to supply hydraulic fluid to the hydraulic piston 278 (Fig. 29) and moving the fast traverse carriage 273 in a backward direction. At this time, the motors 288 and 313 and the fast traverse carriage 273 are simultaneously moving rearwardly.

When the fast traverse carriage 273 reaches the limit of its backward travel, it engages the retract limit switch 446a and closes the contacts 446 and 447 thereof (Fig. 22). The closing of the contacts 446 energizes the relay 464 as described above, opening its normally closed contacts 508 and deenergizing the solenoid 512 so that the fast traverse carriage 273 is brought to rest.

The closing of the retract limit switch 447 completes a circuit from the power lines 452 and 459 to the indexing motor 267, causing the latter to rotate. As soon as the indexing cam 514 (Fig. 20) moves off the switch 448, it snaps to the position shown in Fig. 30 with the movable contact 449 engaging the fixed contact 515. This connects the power line 452 directly to the conductor 516 so that the indexing motor 267 continues to run although the relay 455 is deenergized as soon as the movable switch contact 449 of the indexing switch 448 leaves the fixed contact 450.

The indexing motor 267 (Figs. 20 and 30) rotates the turn-table 261 until the next indexing cam 514 (which is located on a radius through the next test part 32) engages the indexing switch 448. When this happens, the movable contact 449 of the indexing switch 448 is moved out of engagement with the fixed contact 515 and into engagement with the fixed contact 450. This opens the circuit to the indexing motor 267 causing it to stop. Further, since the relay 473 is now deenergized, the contacts 454 thereof are engaged so that the forward hydraulic valve solenoid 457 is energized to drive the fast traverse carriage 273 forwardly, whereupon the cycle is repeated essentially in the manner described above.

In Fig. 34 are shown representative records such as might be obtained at low, medium and high levels on a test part such as a turbine blade, for example. In examining these records, it should be observed that if the contour of the test part is exactly in accordance with specifications, the points 325 representing the actual contour will lie along a straight line passing through the points 324 representing the specified contour. If the test part is not in accordance with specifications, the points 325 will be on either side of a line passing through the nominal points 324, and the lateral distance from any point 325 to a line through the nominal points 324 will be an accurate measure of the deviation at that point.

Figure 35:
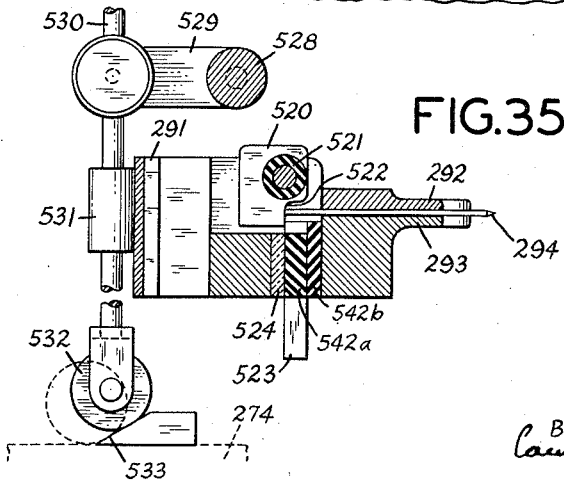
Fig. 35 illustrates schematically a modified form of multiprobe unit in which the contacts are normally closed.

In case it is desired to gauge parts made of nonconducting materials such as ceramic materials, for example, a normally closed multiprobe unit of the type shown in Fig. 35 may be employed in conjunction with the modified amplifier circuit illustrated in Fig. 36. The multiprobe unit shown in Fig. 35 is essentially the same as that shown in Figs. 25 and 26 except that the upper and lower plates 292 and 293 are made of conducting material. Also, a plurality of movable contacts 520 are pivotally mounted on an insulated shaft 521 journalled within the holder 291. The movable contacts 520 are provided with substantially vertical edges 522 which are adapted to rest against the edges of corresponding vertical contacts 523 secured within the holder 291. The contacts 523 may be held between the insulators 524 and 524b and spaced to correspond to the pins 294 by the insulators 524a. The rear ends of the probe pins 294 are also adapted to rest against the vertical edges 522 of the movable contacts 520, as shown, and serve as actuators for the movable contacts 520.

Normally, the movable contacts 520 are in engagement with the fixed contacts 523. However, when the probe pins 294 are moved into engagement with the surface of the test part 32, the movable contacts 520 are moved out of engagement with the fixed contacts 523, opening circuits which results in the recording of marks on the record strip, as described in greater detail below. Since the circuits for each of the probes 294 are identical, it will be necessary to describe only one in detail.

Referring now to Fig. 36, the conducting upper and lower plates 292 and 293, respectively, and the probe pin 294 are connected to ground, as shown, while the corresponding vertical contacts 523 are connected in circuits each including a conductor 525 which may be connected at the point A to a capacitor 433 and resistor 432 in parallel, in an amplifier of the type shown in Fig. 33. The conductor 525 is also connected by a conductor 526 in series with a resistor 527 to the positive terminal of a suitable source of voltage (not shown).

When the probe pin is out of engagement with the test part 32, the vertical contact 523 is grounded so that the condenser 433 (Fig. 33) is connected to ground through the resistor 527 (Fig. 36). Upon engagement of the probe pin 294 with the test part 32, the movable contact 520 is moved out of engagement with the fixed contact 523 so that the ground connection is broken and a relatively high positive voltage pulse is impressed upon the starter electrode 434 of the tube 435 in the amplifier of Fig. 33. This causes the tube 435 to conduct in the manner described above, so that a mark is made upon the Teledeltos strip 303 by the corresponding stylus 315.

It will be observed that engagement of the probe pins 294 with the test piece 32, will cause the pins 294 to move backwardly within the upper and lower plates 292 and 293, respectively. As a result, the tips of the probe pins 294 may no longer lie along a line having the same contour as that desired for the test part 32. In order to restore them to the correct position, the movable contacts 520 may be weighted or spring loaded so that they tend to apply sufficient force at the rear ends of the pins 294 to move them to the correct positions after the pins 294 have been disengaged from the test part 32.

Alternatively, a press bar 528 may be provided for this purpose as shown in Fig. 35. The press bar 528 may be mounted above the movable contacts 520 on an arm 529 secured to a vertical rod 530 mounted for sliding vertical movement in a sleeve 531 secured to the multiprobe holder 291. The lower end of the rod 530 carries a wheel 532 which is adapted to cooperate with a cam surface 533 on the bed plate 274 to restore the pins 294 to the correct positions.

Thus, when the multiprobe unit 291 (Fig. 35) is in the retracted position, the rod 530 is in its lowermost position so that the press bar 528 rests on the upper edges of the movable contacts 520, thus forcing the probe pins 294 to their correct positions. When the multiprobe unit 291 is advanced toward the test part 32, the rod 530 is lifted by the cam surface 533 to move the press bar 538 out of engagement with the movable contacts 520 so that the latter are free to move in the clockwise direction when pushed by the probe pins 294 upon engagement thereof with the test part 32.

In case it is desired to gauge the contours of walls defining a cavity, such as the contours of the opposed faces of adjacent turbine blades in assembled position, the apparatus shown in Fig. 7 may be modified as indicated in Fig. 37. In Fig. 37, a turbine rotor 600, for example, having a plurality of blades 601 assembled thereon, may be independently supported, for example, in its bearings while the measurements are being made. Also, the arm 48 is provided with a resilient probe 603 which is suitably shaped to enter the cavity between two adjacent blades 601 to gauge one of the faces thereof. In order to permit movement of the probe 603 to different stations, the gear box 50a may be modified so as to be moved by the lead screw 39, for example, the gear box 65, the motor 50, the drum 57 and the scanners 54 and 55 (Fig. 8) also being suitably mounted for movement with the gear box 50a.

The probe 603 is resilient so that its tip will be displaced by engagement with the wall of the cavity but will return accurately to its initial position when the probe is retracted. The other opposed blade face may be gauged by reversing the position of the probe 603 or by providing another suitably shaped probe for this purpose. This modification operates essentially in the same manner as the single probe apparatus shown in Fig. 8.

From the foregoing, it will be apparent that the invention provides novel and highly effective apparatus for determining deviations of the contour of a test part from standard specifications. By producing a signal or a reference mark corresponding to the actual contour specified for the piece and subsequently producing other signals or markings corresponding to the actual contour of the piece, deviations from the specified contour can be readily determined accurately. The apparatus is sturdy and can be operated by semi-skilled personnel since only loading and unloading are required in actual operation. Further, the apparatus can be set up in a short time and the preparation of multiprobe units suitable for any particular test part is well within the scope of ordinary tool room practice.

It will be readily apparent that the several representative embodiments described above can be modified considerably within the spirit of the invention. For example, in the single probe embodiment, it would be possible to move the probe laterally with respect to the test part to the several gauging stations, instead of moving the test part. Also, the probe might be held stationary and the test part moved toward and away from it, instead of advancing the probe towards the test part and retracting it therefrom, as described above. Other modifications will be readily apparent to those skilled in the art.

While several specific forms have been described above and illustrated in the drawings, they are not intended to be restrictive, but are susceptible of numerous modifications in form and detail within the scope of the following claims.

We claim:

1. In apparatus for gauging a portion of a test part, said portion being disposed indifferently at some place within a distribution range representing variations in the dimensional condition of said portion with respect to a reference dimensional condition thereof, the combination of probe means adapted to gauge the dimensional condition of said portion by engagement therewith, a support for supporting said test part in predetermined location with respect thereto, a member, means for producing relative approaching movement of both said probe means and said member with respect to said support to bring said probe means and said test part portion into engagement, means maintaining said probe means and said member in fixed spatial relation with each other during the onset of said relative movement, means for providing an electric signal when in the course of said relative movement said member reaches a position so that a predetermined spatial relationship exists between said member and said support corresponding to an engagement of said probe means with a test part portion of said reference dimensional condition, means permitting yielding between said probe means and said member so that, for any disposition of said portion in said range, said probe means in each relative movement engages with said portion, and said member in the same relative movement reaches said position, and indicating means rendered operative upon engagement of said probe means with said portion, said signalling means and indicating means affording, cooperatively, an indication of the dimensional condition of said portion.

2. In apparatus for gauging a test part, the combination of probe means, a support for accurately supporting in a predetermined position a test part having a portion to be gauged, means for producing relative approaching movement between said probe means and said support to bring said probe means and said portion of said test part into engagement, means responsive to relative displacement between the probe means and the part resulting from said relative movement for providing an electric signal when a predetermined spatial relationship exists between said probe means and said support and indicating means rendered operative upon engagement of said probe means with said portion for signalling when said probe means and said portion of said test part come into engagement, said indicating means and said means responsive to relative displacement being constructed and arranged to be individually operative during each gauging operation and to afford, cooperatively, an indication of a dimensional condition of the gauged portion of the part.

3. In apparatus for gauging a test part, the combination of probe means, a support for a test part, means for producing relative approaching movement between said probe means and said support to bring said probe means and said test part into engagement, means for providing an electric signal when a predetermined spatial relationship exists between said probe means and said support, means for signalling when said probe means and said test part come into engagement, and means for selectively recording said signals in spaced relation, the spacing varying proportionally to the relative displacement between said probe means and said support in moving between the two positions where said signals are produced.

4. In apparatus for gauging a test part, the combination of probe means, a support for accurately supporting in a predetermined position a test part having a portion to be gauged, means for producing relative approaching movement between said probe means and said support to bring said probe means and said portion of said test part into engagement, means responsive to relative displacement between the probe means and the part resulting from said relative movement for signalling when a predetermined spatial relationship exists between said probe means and said support indicating means rendered operative upon engagement of said probe means with said portion, said indicating means and said means responsive to relative displacement being constructed and arranged to be individually operative during each gauging operation and to afford, cooperatively, an indication of a dimensional condition of the gauged portion of the part, and means for producing a different relative movement between said probe means and said support to change the gauging station.

5. In apparatus for gauging a test part, the combination of probe means, a support for a test part, means to move said probe means and said support relatively to bring said probe means and said test part into engagement, recording means, a record strip, means to move said recording means and said record strip relatively in proportion to the corresponding relative movement between said probe means and said support, and means operative when a predetermined spatial relation exists between said probe means and said support to actuate selectively said recording means to record on said record strip.

6. In apparatus for gauging a portion of a test part, the combination of probe means, a support for a test part, means for intermittently producing relative approaching movements between said probe means and said support to bring said probe means and said portion of said test part into engagement, recording means, a record strip, means for producing relative movements between said recording means and said record strip in proportion to the corresponding relative movements between said probe means and said support, means rendered operative when a predetermined spatial relation exists between said probe means and said support for causing said recording means to record on said record strip, and means rendered operative when said probe means and said test part portion come into engagement for causing said recording means to record on said record strip, the record made by said recording means representing the distance of said portion from a reference datum positionally fixed with respect to said part.

7. In apparatus for gauging a portion of a test part, the combination of probe means, a support for a test part, means for intermittently producing relative approaching movements between said probe means and said support to bring said probe means and said portion of said test part into engagement, recording means, a record strip, means for producing relative movements between said recording means and said record strip in proportion to the corresponding relative movements between said probe means and said support, means rendered operative when a predetermined spatial relation exists between said probe means and said support for causing said recording means to record on said record strip, means rendered operative when said probe means and said test part portion come into engagement for causing said recording means to record on said record strip, the record made by said recording means representing the distance of said portion from a reference datum positionally fixed with respect to said part, and means for producing a different relative motion between said probe means and said support to change the gauging station.

8. In apparatus for gauging a portion of a test part, the combination of a support for a test part, probe means, means for intermittently advancing said probe means towards said support for engagement with said portion of said test part, a record strip, recording means, means for moving said recording means with respect to said strip in proportion to the advancement of said probe means, means rendered operative upon arrival of said probe means at a predetermined location for causing said recording means to make a record on said strip, means rendered operative upon engagement of said probe means with the test part portion for causing said recording means to make another record on said strip, the record made by said recording means representing the distance of said portion from a reference datum positionally fixed with respect to said part, and means for moving said support laterally with respect to said probe means to present a different part of the test part for gauging.

9. In apparatus for gauging a portion of a test part, the combination of a support for a test part, probe means, means for intermittently producing relative approaching movements between said probe means and said support to bring said probe means into engagement with said portion of said test part, recording means, a record strip, means for producing relative movements between the recording means and record strip in accordance with the relative movements between the probe means and the support, means actuated when a predetermined spatial relationship exists between said probe means and said support for initiating operation of said recording means, means rendered operative when another spatial relationship exists between said probe means and said support for causing said recording means to make a record on said record strip, and control means responsive to engagement of said probe means with said test part portion for causing said recording means to make another record on said record strip, said records together representing the distance of said portion from a reference datum positionally fixed with respect to said part.

10. In apparatus for gauging a portion of a test part, the combination of a support for a test part, probe means, means for intermittently advancing said probe means towards said support for engagement with said portion of said test part, a record strip, recording means, means for moving said recording means with respect to said record strip in proportion to the advancement of said probe means towards said support, means actuated upon arrival of said probe means at a predetermined location for rendering said moving means effective to move said recording means, means actuated upon arrival of said probe means at another predetermined location for causing said recording means to make a record on the record strip and means actuated upon engagement of said probe means with the test part portion for causing said recording means to make another record on the record strip, said records together representing the distance of said portion from a reference datum positionally fixed with respect to said part.

11. In apparatus for gauging a test part, the combination of a support for a test part, a plurality of probe means disposed to gauge different portions of the test part, means for moving said respective probe means simultaneously towards the portions of the test part to be gauged thereby by invariably all of said probe means, recording means for each of said probe means, a record strip common to all said recording means, means actuated upon arrival of at least one of said probe means at a predetermined location to actuate the recording means corresponding thereto to record upon said common record strip, and means individual to each of said probe means and actuated upon engagement of the test part with the probe means corresponding thereto to actuate the recording means corresponding thereto to record upon said common record strip.

12. In apparatus for gauging a test part, the combination of a support for a test part, a plurality of probe units disposed to gauge different portions of the test part and each comprising a plurality of of probe means, means for moving said respective probe units simultaneously towards the portion of the test part to be gauged thereby by invariably all of the probe means for each probe unit, a plurality of recording units corresponding to said respective probe units and each comprising a plurality of recording means, record strip means common to all said recording units and having portions adapted to cooperate with said respective recording units, means for moving each of said recording units with respect to the record strip portion corresponding thereto in proportion to the movement of the corresponding probe unit, means individual to each of said probe units and actuated upon arrival of the corresponding probe means at a predetermined position for causing at least one of the recording means on each of the corresponding units to make a record upon its record strip portion, and means individual to each probe means and actuated upon engagement thereof with the test part for causing the corresponding recording means to make another record on the record strip.

13. In apparatus for gauging a test part, the combination of at least one support for a test part, a plurality of probe units disposed to gauge different portions of the test part and each comprising a plurality of probe means, means for moving said respective probe units simultaneously towards the portion of the test part to be gauged thereby by invariably all of the probe means for each probe unit, a plurality of recording units corresponding to said respective probe units and each comprising a plurality of recording means, record strip means common to all said recording units and having portions adapted to cooperate with said respective recording units, means for moving each of said recording units with respect to the record strip portion corresponding thereto in proportion to the movement of the corresponding probe unit, means individual to each of said probe units and actuated upon arrival of the corresponding probe means at a predetermined position for causing at least one of the recording means of each of the corresponding recording units to make a record upon its record strip portion, means individual to each probe means and actuated upon engagement thereof with the test part for causing the corresponding recording means to make another record on its record strip portion, and means for moving said support successively into operative relationship with said respective probe units.

14. In apparatus for gauging a portion of a test part, the combination of probe means adapted to gauge said portion by engagement therewith, a support for a test part, means intermittently operative to move said probe means and said support relatively to bring said probe means and said support of said test part into engagement, means establishing a predetermined relative position between said probe means and the part corresponding to a predetermined reference portion distance taken with respect to said part, and means for indicating the relation between the relative position where said probe means and said test part portion come into engagement and said predetermined relative position.

15. In apparatus for gauging a portion of a test part, the combination of probe means, a support for accurately supporting in a predetermined position a test part having a portion to be gauged, means for producing relative approaching movement between said probe means and said support to bring said probe means and said portion of said test part into engagement, means responsive to relative displacement resulting from said relative movement for indicating when said probe means is at a predetermined relative position with respect to a reference datum means for measuring the distance advanced by said probe means from said predetermined relative position to engagement with said portion, said distance affording an indication of a dimensional condition of said portion, and means actuated upon engagement of said probe means with said test part portion for rendering said relative movement producing means ineffective to produce said relative movement.

16. In apparatus for gauging a portion of a test part, the combination of first probe means adapted to gauge said portion by engagement therewith, a support for accurately supporting in a predetermined position a test part having a portion to be gauged, means for producing relative approaching movement between said probe means and said support to bring said probe means and said portion of said test part into engagement, means responsive to relative displacement between the probe means and the support for signalling when said probe means reaches a predetermined relative position with respect to a reference datum, said position corresponding to an outside tolerance for said portion of said test part, indicating means rendered operative when said probe means engages with said portion for signalling when said probe means engages said portion, and means responsive to said relative displacement for signalling when said probe means reaches a different predetermined position with respect to said reference datum, said different position corresponding to another outside tolerance for said portion, said indicating means and said means responsive to relative displacement being constructed and arranged to be individually operative during each gauging operation and to afford, cooperatively, an indication of a dimensional condition of the portion.

17. In apparatus for gauging a portion of a test part, the combination of a support for a test part having a portion to be gauged, first probe means, means for producing relative movement between said probe means and said support to bring said first probe means into engagement with said portion of said test part, second probe means, stop means, means for producing relative movement between said second probe means and said stop means, in synchronism with the relative movement between said first probe means and said support, to bring said stop means and said second probe means into engagement when said first probe means and said support are at relative positions corresponding to a predetermined value for the distance between said test part portion and a reference datum, indicating means responsive to engagement of said first probe means and said portion, and second indicating means responsive to engagement of said second probe means and said stop means.

18. In apparatus for gauging a portion of a test part, the combination of a support for a test part having a portion to be gauged, first probe means, means for producing relative movement between said probe means and said support to bring said first probe means into engagement with said portion of said test part, second and third probe means, first and second stop means, means for producing relative movement between said second probe means and said first stop means and also between said third probe means and second stop means in synchronism with the relative movement between said first probe means and said support, to bring said second and third probe means into engagements with said first and second stop means, respectively, when said first probe means and said support are at relative positions corresponding to minimum and maximum distances, respectively, for said test part portion with respect to a reference datum, a plurality of indicating means responsive, respectively, to engagement of said second and third probe means with their corresponding first and second stop means, and indicating means responsive to engagement of said first probe means and said portion.

19. In gauging apparatus, the combination of a plurality of gauging mechanisms each including probe means, a support for a test part, means for moving said support relatively with each gauging mechanism in turn to bring the test part carried by the support successively into engagement with the respective probe means of said gauging mechanisms, a record strip, a plurality of recording means respectively corresponding with said gauging mechanisms, means for producing successive relative movements between said record strip and said recording means, each last-named relative movement corresponding to and being in proportion to the relative movement of said support with a respective gauging mechanism, and a plurality of control means respectively responsive to the engagements of the probe means in said gauging mechanisms with said part for respectively causing the recording means corresponding with said gauging mechanisms to make records on said strip representing the distances of the respective places of engagement from a reference datum positionally fixed with respect to said part.

20. In apparatus for gauging a test part, the combination of a support for a test part, a plurality of probe means disposed to gauge different portions of the test part, means for moving said respective probe means simultaneously towards the portions of the test part to be gauged thereby by invariably all of said probe means, recording means for each of said probe means, a common record strip for all said recording means, means actuated upon arrival of at least one of said probe means at a predetermined location to actuate the recording means corresponding thereto to record upon said record strip, means individual to each of said probe means and actuated upon engagement of the test part with the probe means corresponding thereto to actuate the recording means corresponding thereto to record upon said record strip, and means responsive to movement of said probe means toward said test part to a predetermined position for reversing the direction of movement of said probe means and moving it away from said test part.

21. In apparatus for gauging a test part, the combination of a support for a test part, a plurality of probe means disposed to gauge different portions of the test part, means for moving said respective probe means simultaneously towards the portions of the test part to be gauged thereby by invariably all of said probe means, means actuated upon arrival of at least one of said probe means at a predetermined location to actuate the recording means corresponding thereto to record upon said record strip, means individual to each of said probe means and actuated upon engagement of the test part with the probe means corresponding thereto to actuate the recording means corresponding thereto to record upon said record strip, means responsive to movement of said probe means toward said test part to a predetermined position for reversing the direction of movement of said probe means and moving it away from said test part, and means to move said test part to another position relative to said probe means upon movement of said probe means to a predetermined position away from said test part.

22. In apparatus for gauging a test part, the combination of a support for a test part, a plurality of probe means disposed to gauge different portions of the test part, means for moving said respective probe means simultaneously towards the portions of the test part to be gauged thereby by invariably all of said probe means, recording means for each of said probe means, a common record strip for all said recording means, means actuated upon arrival of at least one of said probe means at a predetermined location to actuate the recording means corresponding thereto to record upon said record strip, means individual to each of said probe means and actuated upon engagement of the test part with the probe means corresponding thereto to actuate the recording means corresponding thereto to record upon said record strip, another group of probe means disposed to gauge a different portion of said test part than the first-mentioned plurality of probe means, recording means actuated by contact of said another group of probe means with said test part to make a conjoint record upon said record strip, and means to move said test part to present it to said first-mentioned plurality of probe means and to said another group of probe means in succession.

23. High precision gauging apparatus comprising, first mounting means for supporting an article in predetermined location with respect thereto, a probe means having an electrically conductive portion engageable with an electrically conductive portion to be gauged of said article, second mounting means for supporting said probe means in a relative location thereto which is predetermined for said engageable portion while the same is in disengaged condition, means for producing in a path a relative movement between said two mounting means to provide between said portions a transient engagement condition in which both said probe means and said article are substantially undeformed, electric circuit means including a circuit through both said portions when engaged for providing a signal in substantially instantaneous response to the occurrence of said engagement condition, relative movement referencing means for providing for said path a continuing identification of an exactly located portion thereof as corresponding with an exact predetermined relative position of said second to said first mounting means, and relative movement simulating information storage means synchronized with said relative movement and responsive to said signal for retaining after the occurrence of said engagement condition a manifestation of the exact relative displacement in said path undergone by said second mounting means between said exactly located portion of said path and the occurrence in said path of said engagement condition, said manifestation when correlated with said continuing identification providing a high precision measure of a dimensional condition of said article portion.

24. High precision gauging apparatus comprising, first mounting means for supporting an article in a relative location thereto which is predetermined in a specified direction, a probe means with an electrically conductive portion engageable by substantially a point contact engagement with an electrically conductive portion of said article to provide a determination of the deviation of said article portion from a specified dimensional condition therefor in said direction, second mounting means for supporting said probe means in a relative location thereto which is predetermined in said direction for said engageable portion while the same is in disengaged conditions, means for producing in a path relative movement in said direction between said two mounting means to provide intermediate conditions for said portions of held engagement and disengagement, a transient engagement condition for said portions in which said probe means and said article are undeformed, electric circuit means including a circuit through both said portions when in said transient engagement condition for providing a signal in substantially instantaneous response to the occurrence of said transient engagement condition, relative movement referencing means for providing for said path a continuing identification of an exactly located portion thereof as corresponding with a predetermined relative position of said second to said first mounting means, and relative movement simulating information storage means synchronized with said relative movement and responsive to said signal for retaining after the occurrence of said transient engagement condition a manifestation of the exact relative displacement undergone by said second mounting means in said path between said exactly located portion of said path and the occurrence of said transient engagement condition in said path, said manifestation when correlated with said continuing identification providing a high precision measure of the deviation of the article portion gauged from said specified dimensional condition.

25. High precision gauging apparatus comprising, a first mounting means for supporting an article in predetermined location with respect thereto, a probe means having an electrically conductive portion engageable with an electrically conductive portion of said article to provide a determination of the deviation of said article portion from a specified dimensional condition therefor, second mounting means for supporting said probe means in a relative location thereto which is predetermined for said engageable portion while the same is in disengaged position, means for producing in a path a relative movement between said two mounting means to provide between said portions a transient engagement position in which both said probe means and said article are substantially undeformed, electric circuit means including a circuit through both said portions when engaged for providing a signal in substantially instantaneous response to the occurrences of said engagement condition, means permitting yielding between said second mounting means and said probe means engageable portion for engagement conditions other than said transient engagement condition, relative movement referencing means for providing for said path a continuing identification of an exactly located portion thereof corresponding with a predetermined relative position of said second to said first mounting means, said predetermined relative position representing the transient engagement condition between said probe means engageable portion and an article portion of said specified dimensional condition, and relative movement simulating information storage means synchronized with said relative movement and responsive to said signal for obtaining after the occurrence of said engagement condition a manifestation of the exact relative displacement in said path undergone by said second mounting means between said exactly located portion of said path and the occurrence in said path of said engagement condition, said manifestation when correlated with said continuing identification providing a high precision measure of the deviation of the article portion gauged from said specified dimensional condition.

26. High precision gauging apparatus comprising, first mounting means for supporting an article in predetermined location with respect thereto, a probe means having an electrically conductive portion engageable with an electrically conductive portion to be gauged of said article, second mounting means for supporting said probe means in a relative location thereto which is predetermined for said engageable portion while the same is in disengaged condition, means for producing a relative movement between said two mounting means to provide between said portions a transient engagement condition in which both said probe means and said article are substantially undeformed, electric circuit means including a circuit through both said portions when engaged for providing a signal in substantially instantaneous response to the occurrence of said engagement condition, relative movement referencing means for providing another signal substantially instantaneously when after the start of said relative movement said second mounting means bears an exact predetermined relative position to said first mounting means, and relative movement simulating information storage means synchronized with said relative movement and responsive to both said signals for retaining after the latest occurring signal a manifestation of the exact relative displacement undergone by said second mounting means between said predetermined relative position and the occurrence of said engagement condition, said manifestation when correlated with said predetermined relative position providing a high precision measure of a dimensional condition of said article portion.

27. High precision gauging apparatus comprising, first mounting means for supporting an article in predetermined location with respect thereto, a probe means having an electrically conductive portion engageable with an electrically conductive portion to be gauged of said article, second mounting means for supporting said probe means in a relative location thereto which is predetermined for said engageable portion while the same is in disengaged condition, motor means for producing in a path a relative movement between said two mounting means to bring said portions into a transient engagement condition in which both said probe means and said article are substantially undeformed, electric circuit means including a circuit through both said portions when engaged for providing a signal in substantially instantaneous response to the occurrence of said engagement condition, relative movement referencing means for providing for said path a continuing identification of an exactly located portion thereof as corresponding with an exact predetermined relative position of said second to said first mounting means, relative movement simulating information storage means synchronized with said relative movement and responsive to said signal for retaining after the occurrence of said engagement condition a manifestation of the exact relative displacement in said path undergone by said second mounting means between said exactly located portion of said path and the occurrence in said path of said engagement condition, said manifestation when correlated with said continuing identification providing a high precision measure of a dimensional condition of said article portion, and control means for reversing said motor after the occurrence of said transient engagement condition to disengage said probe means engageable portion from said article portion.

28. High precision gauging apparatus comprising, first mounting means for supporting an article in predetermined location with respect thereto, a probe means having an electrically conductive portion engageable with an electrically conductive portion to be gauged of said article, second mounting means for supporting said probe means in a relative location thereto which is predetermined for said engageable portion while the same is in disengaged condition, motor means for producing in a path a relative movement between said two mounting means to bring said portions into a transient engagement condition in which both said probe means and said article are substantially undeformed, means permitting yielding between said second mounting means and said probe means engageable portion for engageable conditions other than said transient engagement condition, electric circuit means including a circuit through both said portions when engaged for providing a signal in substantially instantaneous response to the occurrence of said engagement condition, relative movement referencing means for providing for said path a continuing identification of an exactly located portion thereof as corresponding with an exact predetermined relative position of said second to said first mounting means, relative movement simulating information storage means synchronized with said relative movement and responsive to said signal for retaining after the occurrence of said engagement condition a manifestation of the exact relative displacement in said path undergone by said second mounting means between said exactly located portion of said path and the occurrence in said path of said engagement condition, said manifestation when correlated with said continuing identification providing a high precision measure of a dimensional condition of said article portion, and control means for reversing said motor after the occurrence of said transient engagement condition to disengage said probe means engageable portion from said article portion.

29. High precision gauging apparatus comprising, first mounting means for supporting an article in predetermined location with respect thereto, a probe means having an electrically conductive portion engageable with an electrically conductive portion to be gauged of said article, second mounting means for supporting said probe means in a relative location thereto which is predetermined for said engageable portion while the same is in disengaged condition, motor means for producing a relative movement between said two mounting means to bring said portions into a transient engagement condition in which both said probe means and said article are substantially undeformed, electric circuit means including a circuit through both said portions when engaged for providing a signal in substantially instantaneous response to the occurrence of said engagement condition, relative movement referencing means for providing another signal substantially instantaneously when after the start of said relative movement said second mounting means bears an exact predetermined relative position to said first mounting means, relative movement simulating information storage means synchronized with said relative movement and responsive to both said signals for retaining after the latest occurring signal a manifestation of the exact relative displacement undergone by said second mounting means between said predetermined relative position and the occurrence of said engagement condition, said manifestation when correlated with said predetermined relative position providing a high precision measure of a dimensional condition of said article portion gauged, and control means for reversing said motor after the occurrence of said transient condition to disengage said probe means engageable portion from said article portion.

References Cited in the file of this patent

UNITED STATES PATENTS

| Number | Name | Date |
|---|---|---|
| Re. 22,953 | Praeg | Dec. 23, 1947 |
| 980,851 | Updegraff | Jan. 3, 1911 |
| 992,460 | Updegraff | May 16, 1911 |
| 992,926 | Updegraff | May 23, 1911 |
| 1,206,040 | Simpson | Nov. 28, 1916 |
| 1,254,062 | Olson | Jan. 22, 1918 |
| 1,274,698 | Edgecomb | Aug. 6, 1918 |
| 1,379,916 | Gueugnon | May 31, 1921 |
| 1,553,814 | Hansen | Sept. 15, 1925 |
| 1,682,464 | Arelt | Aug. 28, 1928 |
| 1,688,308 | Harding | Oct. 16, 1928 |
| 1,882,962 | Sawford | Oct. 18, 1932 |
| 2,056,918 | Bristol | Oct. 6, 1936 |
| 2,109,976 | Pierce, Jr. | Mar. 1, 1938 |
| 2,136,134 | Holley | Nov. 8, 1938 |
| 2,248,973 | Eby | July 15, 1941 |
| 2,311,804 | Wright | Feb. 23, 1943 |
| 2,363,077 | Moore | Nov. 21, 1944 |
| 2,367,513 | Malhiot | Jan. 16, 1945 |
| 2,394,489 | Rowe | Feb. 5, 1946 |
| 2,398,562 | Russell | Apr. 16, 1946 |
| 2,401,962 | Reynolds | June 11, 1946 |
| 2,417,148 | Wright | Mar. 11, 1947 |
| 2,445,068 | Jackson | July 13, 1948 |
| 2,495,891 | Davis | Jan. 31, 1950 |
| 2,588,717 | Goodwin | Mar. 11, 1952 |
| 2,629,936 | Cronstedt | Mar. 3, 1953 |

FOREIGN PATENTS

| Number | Country | Date |
|---|---|---|
| 401,054 | Italy | Jan. 4, 1943 |